United States Patent
Armstrong et al.

(10) Patent No.: US 10,984,413 B2
(45) Date of Patent: Apr. 20, 2021

(54) COMPUTER IMPLEMENTED METHOD FOR PROCESSING A FINANCIAL TRANSACTION AND A SYSTEM THEREFOR

(71) Applicant: Identitii Pty Ltd, Surry Hills (AU)

(72) Inventors: Nick Armstrong, Sydney (AU); Ben Buckingham, Sydney (AU); Daniel Friedman, Sydney (AU); Elliot Shepherd, Sydney (AU); Eric Knight, Sydney (AU)

(73) Assignee: IDENTITII PTY LTD, Surry Hills (AU)

( * ) Notice: Subject to any disclaimer, the term of this patent is extended or adjusted under 35 U.S.C. 154(b) by 197 days.

(21) Appl. No.: 15/752,711

(22) PCT Filed: Aug. 12, 2016

(86) PCT No.: PCT/AU2016/000279
§ 371 (c)(1),
(2) Date: Feb. 14, 2018

(87) PCT Pub. No.: WO2017/027900
PCT Pub. Date: Feb. 23, 2017

(65) Prior Publication Data
US 2018/0247302 A1   Aug. 30, 2018

(30) Foreign Application Priority Data

Aug. 14, 2015 (AU) ................. 2015903292
Jan. 27, 2016 (AU) ................. 2016900239
May 20, 2016 (AU) ................. 2016901924

(51) Int. Cl.
*G06Q 20/38* (2012.01)
*G06F 21/64* (2013.01)
*H04L 29/06* (2006.01)

(52) U.S. Cl.
CPC .......... *G06Q 20/382* (2013.01); *G06F 21/64* (2013.01); *G06Q 20/385* (2013.01);
(Continued)

(58) Field of Classification Search
CPC .... G06F 21/64; G06Q 20/382; G06Q 20/385; G06Q 20/3674
See application file for complete search history.

(56) References Cited

U.S. PATENT DOCUMENTS 10,346,814 B2 * 7/2019 Pennanen .......... G06Q 20/4012
2004/0006692 A1   1/2004 Honda et al.
(Continued)

FOREIGN PATENT DOCUMENTS

EP        2 843 587        3/2015
WO     WO 2015/116998     8/2015

OTHER PUBLICATIONS

Step by Step Towards Creating a Safe Smart Contract: Lessons and Insights from a Cryptocurrency Lab, https://fc16.ifca.ai/bitcoin (Year: 2014).*

(Continued)

*Primary Examiner* — Elizabeth H Rosen
*Assistant Examiner* — Amanulla Abdullaev
(74) *Attorney, Agent, or Firm* — Nixon & Vanderhye P.C.

(57) ABSTRACT

A computer implemented method for processing a financial transaction includes the steps of transmitting one or more documents pertaining to the financial transaction, from a first intermediary server to a first document store, generating an enriched data record from the one or more documents, at the first intermediary server, and adding the enriched data record into a blockchain, from the first intermediary sever, requesting generation of a token corresponding to the financial transaction, to a token server, from the first intermediary server, via a messaging bus, generating the token at the token (Continued)

server and adding the token into the blockchain from the token server, transmitting the token to the first intermediary server from the token server, via the messaging bus, and transmitting the token from the first intermediary server to the first document store.

20 Claims, 23 Drawing Sheets

(52) U.S. Cl.
CPC ....... *G06Q 20/389* (2013.01); *G06Q 20/3823* (2013.01); *G06Q 20/3827* (2013.01); *H04L 63/0442* (2013.01); *H04L 63/0471* (2013.01)

(56) References Cited

U.S. PATENT DOCUMENTS

| | | | |
|---|---|---|---|
| 2008/0201580 A1 | 8/2008 | Savitzky et al. | |
| 2009/0100041 A1 | 4/2009 | Wilson | |
| 2009/0307495 A1* | 12/2009 | Matsuo | H04L 9/002 713/171 |
| 2011/0184910 A1 | 7/2011 | Love et al. | |
| 2012/0203665 A1* | 8/2012 | Morgan | H04W 12/06 705/26.41 |
| 2014/0279519 A1 | 9/2014 | Mattes et al. | |
| 2015/0332283 A1* | 11/2015 | Witchey | G06F 21/645 705/3 |
| 2016/0342994 A1* | 11/2016 | Davis | G06Q 20/027 |
| 2017/0132630 A1* | 5/2017 | Castinado | G06Q 20/382 |
| 2018/0314809 A1* | 11/2018 | Mintz | H04L 63/10 |

OTHER PUBLICATIONS

Bird & Bird Blockchain 2.0, smart contracts and challenges, Bird & Bird; twobirds.com (Year: 2016).*
International Search Report dated Nov. 1, 2016 issued in PCT International Patent Application No. PCT/AU2016/000279, 3 pages.
Nakamoto, Satoshi et al., "Bitcoin: A Peer-to-Peer Electronic Cash System." (2008). [Retrieved from Internet on Oct. 25, 2016]. URL: http://web.archive.org/web/20150616021417/http://www.cryptovest.co.uk/resources/Bitcoin%20paper%20riginal.pdf, published on or before Jun. 16, 2015 as per Wayback Machine, 9 pp.
Snow, Paul et al., "Factom Ledger by Consensus," [Retrieved from Internet on Oct. 25, 2016]. URL: http://bravenewcoin.com/assets/Whitepapers/FactomLedgerbyConsensus.pdf, Jan. 17, 2015, 28 pp.

* cited by examiner

| Issue | | SWIFT | Ripple | Proposed |
|---|---|---|---|---|
| 1270 { | Commercial | Bypass SWIFT | No competition, given infrastructure focus | 1. Banks turn cost centre re SWIFT processing into profit pool<br><br>2. *Optional add-on:* new revenue from e.g. PaaS |
| 1271 { | Security | SWIFT-based | Block chain | 1. Bank's private system |
| 1272 { | Technical | Committed infrastructure spend is slow & expensive | Private gateway establishment | Sparro (anonymized) messaging |

FIG. 13

COMPUTER IMPLEMENTED METHOD FOR PROCESSING A FINANCIAL TRANSACTION AND A SYSTEM THEREFOR

This application is the U.S. national phase of International Application No. PCT/AU2016/000279 filed Aug. 12, 2016 which designated the U.S. and claims priority to Australian Patent Application No. 2015903292 filed Aug. 14, 2015, Australian Patent Application No. 2016900239 filed Jan. 27, 2016, and Australian Patent Application No. 2016901924 filed May 20, 2016, the entire contents of each of which are hereby incorporated by reference.

FIELD OF THE INVENTION

The present invention relates to financial transactions and in particular to a method and a system for processing a financial transaction.

The invention has been developed primarily for use in/with financial transactions and will be described hereinafter with reference to this application. However, it will be appreciated that the invention is not limited to this particular field of use.

BACKGROUND OF THE INVENTION

A financial transaction comprises at least two parties, with a transfer of currency taking place between the two parties. The currency may include electronic currency and fiat currency. In either case, any financial transaction includes a plurality of data associated with the financial transaction. The plurality of data may include payment metadata such as account numbers of the at least two parties, Business Identifier Codes (BIC) of the financial institutions corresponding to the at least two parties, amount of currency to be transferred and type of currency etc. Further, the plurality of data may include regulatory compliance documents such as KYC documents.

Generally, it is difficult to keep track of the plurality of data during the financial transaction. Further, it is even more difficult to ensure that integrity of the plurality of data is maintained either during or after the financial transaction has been completed or to evidence that it existed at a certain point in the financial transaction process. Many settlement systems are characterised by effective one-way transmission of the plurality of data in any given financial transaction (for example systems based on SWIFT messaging). If it is subsequently discovered that there are deficiencies in the plurality of data transmitted, time consuming checking and querying operations and correspondence often ensues before the financial transaction can be effected.

Therefore there remains, in the art, a need for improved methods and systems for processing a financial transaction which do not suffer from the above mentioned issues.

Any discussion of the background art throughout the specification should in no way be considered as an admission that such background art is prior art, nor that such background art is widely known or forms part of the common general knowledge in the field in Australia or any other country.

SUMMARY OF THE INVENTION

According to a first aspect of the present invention, there is provided a computer implemented method for processing a financial transaction, the method comprising the steps of transmitting one or more documents pertaining to the financial transaction, from a first intermediary server to a first document store, generating an enriched data record from the one or more documents, at the first intermediary server, and adding the enriched data record into a blockchain, from the first intermediary sever, requesting generation of a token corresponding to the financial transaction, to a token server, from the first intermediary server, via a messaging bus, generating the token at the token server and adding the token into the blockchain from the token server, transmitting the token to the first intermediary server from the token server, via the messaging bus and transmitting the token from the first intermediary server to the first document store. The token provides a pointer to the enriched data record in the blockchain. Thus the token can used to retrieve the enriched data record at a time of an audit.

In one embodiment of the invention, the computer implemented method further comprises the step of sending a first financial message comprising the token, from the first intermediary server to a second intermediary server, indicative of making a payment to a second user.

In one embodiment of the invention, the computer implemented method further comprises the steps of implementing a smart contract at the token server; and adding the smart contract into the blockchain, from the token server.

In one embodiment of the invention, the computer implemented method further comprises the steps of transmitting the token from the first intermediary server to a first digital device available with a first user, providing the token to a second user, by the first user, providing the token to a second intermediary server, from the second digital device, transmitting the token to a second document store, from the second intermediary server and sending a second financial message comprising the token, from the second intermediary server to the first intermediary server, indicative of making a payment to the first user.

In one embodiment of the invention, the step of generating the enriched data record comprises extracting a plurality of attributes from the one or more documents, at the first intermediary server and combining the plurality of attributes to generate the enriched data record, at the first intermediary server.

In one embodiment of the invention, the step of generating the enriched data record comprises extracting a plurality of attributes from the one or more documents, at the first intermediary server, de-identifying the plurality of attributes to obtain a plurality of de-identified attributes, at the first intermediary server and combining the plurality of de-identified attributes to generate the enriched data record, at the first intermediary server. De-identification of the plurality of attributes ensures that confidentiality of any person or entity involved in the financial transaction is not compromised during a hacking attack on the blockchain.

In one embodiment of the invention, the step of generating the enriched data record comprises extracting a plurality of attributes from the one or more documents, at the first intermediary server, hashing the plurality of attributes to generate a plurality of respective hashes, at the first intermediary server and combining the plurality of hashes to generate the enriched data record, at the first intermediary server. Hashing provides even more protection against tampering of theft, to the one or more documents, as the hashes are irreversible.

In one embodiment of the invention, the computer implemented method further comprises the step of assigning a payment risk rating to the token. The payment risk rating is a direct measure of the regulatory and other compliance checks involved in the financial transaction.

In one embodiment of the invention, the computer implemented method further comprises the steps of transmitting one or more first requests, each comprising the token, from the first intermediary server to the second intermediary server, via the messaging bus, receiving the one or more first requests at the second intermediary server and transmitting the one or more first requests and the token from the second intermediary server to a second document store, generating one or more first responses, each comprising the token, corresponding to the respective one or more first requests, at the second intermediary server, transmitting the one or more first responses from the second intermediary server to the first intermediary server, via the messaging bus, hashing the one or more first requests and the one or more first responses at the second intermediary server to generate one or more first request hashes and one or more first response hashes, respectively, adding the one or more first request hashes and the one or more first response hashes to the enriched data record in the blockchain, from the second intermediary server and receiving the one or more first responses at the first intermediary server and transmitting the one or more first responses to the first document store. This communication between the first intermediary server and the second intermediary server allows the first intermediary server to execute all the necessary compliance checks.

In one embodiment of the invention, the computer implemented method further comprises the steps of hashing the one or more first responses at the first intermediary server to regenerate the one or more first response hashes and verifying the one or more first response hashes with the blockchain from the first intermediary server, using the token. Thus, the integrity of the one or more first responses can be verified with the blockchain, at any given time.

In one embodiment of the invention, each one of the one or more first requests are encrypted with a second public key and signed with a first public key at the first intermediary server, before transmission to the second intermediary server and decrypted with a second private key at the second intermediary server after reception from the first intermediary server. Further, each one of the one or more first responses are encrypted with the first public key and signed with the second public key at the second intermediary server, before transmission to the first intermediary server and decrypted with a first private key at the first intermediary server after reception from the second intermediary server. Using pairs of asymmetrical keys ensures that the requests and the responses are not intercepted during transmission.

In one embodiment of the invention, the one or more first responses comprise one or more second regulatory compliance documents pertaining to a second user.

In one embodiment of the invention, the computer implemented method further comprises the steps of transmitting one or more second requests, each comprising the token, from the second intermediary server to the first intermediary server, via the messaging bus, receiving the one or more second requests at the first intermediary server and transmitting the one or more second requests from the first intermediary server to the first document store, generating one or more second responses, each comprising the token, corresponding to the respective one or more second requests, at the first intermediary server, transmitting the one or more second responses from the first intermediary server to the second intermediary server, via the messaging bus, hashing the one or more second requests and the one or more second responses at the first intermediary server to generate one or more second request hashes and one or more second response hashes, respectively, adding the one or more second request hashes and the one or more second response hashes to the enriched data record in the blockchain, from the first intermediary server and receiving the one or more second responses at the second intermediary server and transmitting the one or more second responses to the second document store. This communication enables the second intermediary server to execute all the necessary compliance checks.

In one embodiment of the invention, the computer implemented method further comprises the steps of hashing the one or more second responses at the second intermediary server to regenerate the one or more second response hashes and verifying the one or more second response hashes with the blockchain from the second intermediary server, using the token. Similar to one or more first responses, the integrity of the one or more second responses can be verified with the blockchain, at any given time.

In one embodiment of the invention, each one of the one or more second requests are encrypted with a first public key and signed with a second public key at the second intermediary server, before transmission to the first intermediary server and decrypted with a first private key at the first intermediary server after reception from the second intermediary server. Further, each one of the one or more second responses are encrypted with the second public key and signed with the first public key at the first intermediary server, before transmission to the second intermediary server and decrypted with a second private key at the second intermediary server after reception from the first intermediary server. Using pairs of asymmetrical keys ensures that the requests and the responses are not intercepted during transmission.

In one embodiment of the invention, the computer implemented method further comprises the steps of adding the first public key from the first intermediary server into the blockchain and adding the second public key from the second intermediary server into the blockchain.

In one embodiment of the invention, the one or more second responses comprise one or more first regulatory compliance documents pertaining to a first user.

According to a second aspect of the present invention, there is provided a system for processing a financial transaction, the system comprising a first intermediary server operably connected to a network and a first document store, a token server operably connected to the network, a messaging bus operably connected to the network and a blockchain operably connected to the network. Further, the first intermediary server is configured to transmit one or more documents pertaining to the financial transaction, to the first document store, generate an enriched data record from the one or more documents and add the enriched data record into the blockchain, request generation of a token corresponding to the financial transaction, to the token server, via the messaging bus and transmit the token to the first document store. Further, the token server is configured to generate the token and add the token into the blockchain and transmit the token to the first intermediary server, via the messaging bus.

In one embodiment of the invention, the system further comprises a second intermediary server operably connected to the network and a second document store. Further, the first intermediary server is further configured to send a first financial message comprising the token, to the second intermediary server, indicative of making a payment to a second user.

In one embodiment of the invention, the token server is further configured to implement a smart contract and add the smart contract into the blockchain.

In one embodiment of the invention, the system further comprises a first digital device operably connected to the network, a second digital device operably connected to the network, a second intermediary server operably connected to the network and a second document store. Further, the first intermediary server is further configured to transmit the token to the first digital device. Further, the first digital device comprises a first memory and a first processor operably connected to the first memory, the first memory comprising a first computer program code, the first computer program code when executed by the first processor, instructs the first processor to receive the token from the first intermediary server, provide the token to the second digital device. Further, the second digital device comprises a second memory and a second processor operably connected to the second memory, the second memory comprising a second computer program code, the second computer program code when executed by the second processor, instructs the second processor to receive the token from the first digital device and provide the token to the second intermediary server. Also, the second intermediary server is configured to receive the token from the second digital device, transmit the token to the second document store and send a second financial message comprising the token, to the first intermediary server, indicative of making a payment to a first user.

In one embodiment of the invention, for generation of the enriched data record, the first intermediary server is configured to extract a plurality of attributes from the one or more documents and combine the plurality of attributes to generate the enriched data record.

In one embodiment of the invention, for generation of the enriched data record, the first intermediary server is configured to extract a plurality of attributes from the one or more documents, de-identify the plurality of attributes to obtain a plurality of de-identified attributes and combine the plurality of de-identified attributes to generate the enriched data record.

In one embodiment of the invention, for generation of the enriched data record, the first intermediary server is configured to extract a plurality of attributes from the one or more documents, hash the plurality of attributes to generate a plurality of respective hashes and combine the plurality of hashes to generate the enriched data record.

In one embodiment of the invention, the first intermediary server is further configured to assign a payment risk rating to the token.

In one embodiment of the invention, the system further comprises a second intermediary server operably connected to the network and a second document store. Further, the first intermediary server is configured to transmit one or more first requests, each comprising the token, to the second intermediary server, via the messaging bus and receive one or more first responses and transmit the one or more first responses to the first document store. Further, the second intermediary server is configured to receive the one or more first requests from the first intermediary server and transmit the one or more first requests and the token to the second document store, generate the one or more first responses, each comprising the token, corresponding to the respective one or more first requests, transmit the one or more first responses to the first intermediary server, via the messaging bus, hash the one or more first requests and the one or more first responses to generate one or more first request hashes and one or more first response hashes, respectively and add the one or more first request hashes and the one or more first response hashes to the enriched data record in the blockchain.

In one embodiment of the invention, the first intermediary server is further configured to hash the one or more first responses to regenerate the one or more first response hashes and verify the one or more first response hashes with the blockchain, using the token.

In one embodiment of the invention, the first intermediary server is further configured to encrypt each one of the one or more first requests with a second public key and sign each one of the one or more first requests with a first public key, before transmission to the second intermediary server and decrypt each one of the one or more first responses with a first private key after reception from the second intermediary server. Further, the second intermediary server is further configured to encrypt the each one of the one or more first responses with the first public key and sign the each one of the one or more first responses with the second public key, before transmission to the first intermediary server and decrypt the each one of the one or more first requests with a second private key after reception from the first intermediary server.

In one embodiment of the invention, the one or more first responses comprise one or more second regulatory compliance documents pertaining to a second user.

In one embodiment of the invention, the system further comprises a second intermediary server connected to the network and a second document store. Further, the second intermediary server is configured to transmit one or more second requests, each comprising the token, to the first intermediary server, via the messaging bus, receive one or more second responses and transmit the one or more second responses to the second document store. Further, the first intermediary server is further configured to receive the one or more second requests and transmit the one or more second requests to the first document store, generate the one or more second responses, each comprising the token, corresponding to the respective one or more second requests, transmit the one or more second responses to the second intermediary server, via the messaging bus, hash the one or more second requests and the one or more second responses to generate one or more second request hashes and one or more second response hashes, respectively and add the one or more second request hashes and the one or more second response hashes to the enriched data record in the blockchain.

In one embodiment of the invention, the second intermediary server is further configured to hash the one or more second responses to regenerate the one or more second response hashes and verify the one or more second response hashes with the blockchain, using the token.

In one embodiment of the invention, the second intermediary server is further configured to encrypt each one of the one or more second requests with a first public key and sign each one of the one or more second requests with a second public key, before transmission to the first intermediary server and decrypt each one of the one or more second responses with a second private key after reception from the first intermediary server. Further, the first intermediary server is further configured to encrypt the each one of the one or more second responses with the second public key and sign the each one of the one or more second responses with the first public key, before transmission to the second intermediary server and decrypt the each one of the one or more second requests with a first private key after reception from the second intermediary server.

In one embodiment of the invention, the first intermediary server is further configured to add the first public key into the blockchain and the second intermediary server is further configured to add the second public key into the blockchain.

In one embodiment of the invention, the one or more second responses comprise one or more first regulatory compliance documents pertaining to a first user.

According to a third aspect of the present invention, there is provided a token server for facilitating processing of a financial transaction, operably connected to a network and configured to generate a token, add the token into a blockchain and transmit the token to a first intermediary server, via a messaging bus.

In one embodiment of the invention, the token server is further configured to implement a smart contract and add the smart contract into the blockchain.

According to a fourth aspect of the present invention, there is provided a first intermediary server for facilitating processing of a financial transaction, operably connected to a network and a first document store, and configured to transmit one or more documents pertaining to the financial transaction, to the first document store, generate an enriched data record from the one or more documents and add the enriched data record into a blockchain, request generation of a token corresponding to the financial transaction, to a token server, via a messaging bus and transmit the token to the first document store.

In one embodiment of the invention, the first intermediary server is further configured to send a first financial message comprising the token, to a second intermediary server, indicative of making a payment to a second user.

In one embodiment of the invention, the first intermediary server is further configured to transmit the token to a first digital device.

In one embodiment of the invention, for generation of the enriched data record, the first intermediary server is configured to extract a plurality of attributes from the one or more documents and combine the plurality of attributes to generate the enriched data record.

In one embodiment of the invention, for generation of the enriched data record, the first intermediary server is configured extract a plurality of attributes from the one or more documents, de-identify the plurality of attributes to obtain a plurality of de-identified attributes and combine the plurality of de-identified attributes to generate the enriched data record.

In one embodiment of the invention, for generation of the enriched data record, the first intermediary server is configured to extract a plurality of attributes from the one or more documents, hash the plurality of attributes to generate a plurality of respective hashes and combine the plurality of hashes to generate the enriched data record.

In one embodiment of the invention, the first intermediary server is further configured to assign a payment risk rating to the token.

In one embodiment of the invention, the first intermediary server is further configured to transmit one or more first requests, each comprising the token, to a second intermediary server, via the messaging bus and receive one or more first responses from the second intermediary server and transmit the one or more first responses to the first document store.

In one embodiment of the invention, the one or more first responses comprise one or more second regulatory compliance documents pertaining to a second user.

In one embodiment of the invention, the first intermediary server is further configured to hash the one or more first responses to regenerate one or more first response hashes and verify the one or more first response hashes with the blockchain, using the token.

In one embodiment of the invention, the first intermediary server is further configured to encrypt each one of the one or more first requests with a second public key and sign each one of the one or more first requests with a first public key, before transmission to the second intermediary server and decrypt each one of the one or more first responses with a first private key after reception from the second intermediary server.

In one embodiment of the invention, the first intermediary server is further configured to receive the one or more second requests from a second intermediary server and transmit the one or more second requests to the first document store, generate one or more second responses, each comprising the token, corresponding to the respective one or more second requests, transmit the one or more second responses to the second intermediary server, via the messaging bus, hash the one or more second requests and the one or more second responses to generate one or more second request hashes and one or more second response hashes, respectively and add the one or more second request hashes and the one or more second response hashes to the enriched data record in the blockchain.

In one embodiment of the invention, the first intermediary server is further configured to encrypt each one of the one or more second responses with a second public key and sign the each one of the one or more second responses with a first public key, before transmission to the second intermediary server and decrypt each one of the one or more second requests with a first private key after reception from the second intermediary server.

In one embodiment of the invention, the first intermediary server is further configured to add the first public key into the blockchain.

According to a fifth aspect of the present invention, there is provided a second intermediary server for facilitating processing of a financial transaction, operably connected to a network and a second document store, and configured to receive the token from the second digital device, transmit the token to the second document store and send a second financial message comprising the token to a first intermediary server, indicative of making a payment to a first user.

According to a sixth aspect of the present invention, there is provided a second intermediary server for facilitating processing of a financial transaction, operably connected to a network and a second document store, and configured to receive one or more first requests, each comprising a token, from a first intermediary server and transmit the one or more first requests and the token to the second document store, generate the one or more first responses, each comprising the token, corresponding to the respective one or more first requests, transmit the one or more first responses to the first intermediary server, via a messaging bus, hash the one or more first requests and the one or more first responses to generate one or more first request hashes and one or more first response hashes, respectively and add the one or more first request hashes and the one or more first response hashes to the enriched data record in the blockchain.

In one embodiment of the invention, the second intermediary server is further configured to encrypt each one of the one or more first responses with a first public key and sign the each one of the one or more first responses with a second public key, before transmission to the first intermediary server and decrypt each one of the one or more first requests with a second private key after reception from the first intermediary server.

According to a seventh aspect of the invention, there is provided a second intermediary server for facilitating processing of a financial transaction, operably connected to a network and a second document store, and configured to transmit one or more second requests, each comprising a token, to a first intermediary server, via a messaging bus and receive one or more second responses from the first intermediary server and transmit the one or more second responses to the second document store.

In one embodiment of the invention, the second intermediary server is further configured to hash the one or more second responses to regenerate one or more second response hashes and verify the one or more second response hashes with the blockchain, using the token.

In one embodiment of the invention, the second intermediary server is further configured to encrypt each one of the one or more second requests with a first public key and sign each one of the one or more second requests with a second public key, before transmission to the first intermediary server and decrypt each one of the one or more second responses with a second private key after reception from the first intermediary server.

In one embodiment of the invention, the second intermediary server is further configured to add the second public key into the blockchain.

In one embodiment of the invention, the one or more second responses comprise one or more first regulatory compliance documents pertaining to a first user.

Other aspects of the invention are also disclosed.

BRIEF DESCRIPTION OF THE DRAWINGS

Notwithstanding any other forms which may fall within the scope of the present invention, a preferred embodiment/preferred embodiments of the invention will now be described, by way of example only, with reference to the accompanying drawings in which:

FIG. 13 provides a comparison of characteristics of embodiments of the present invention as compared with the prior art Swift-based messaging system;

DESCRIPTION OF EMBODIMENTS

Figure 1:
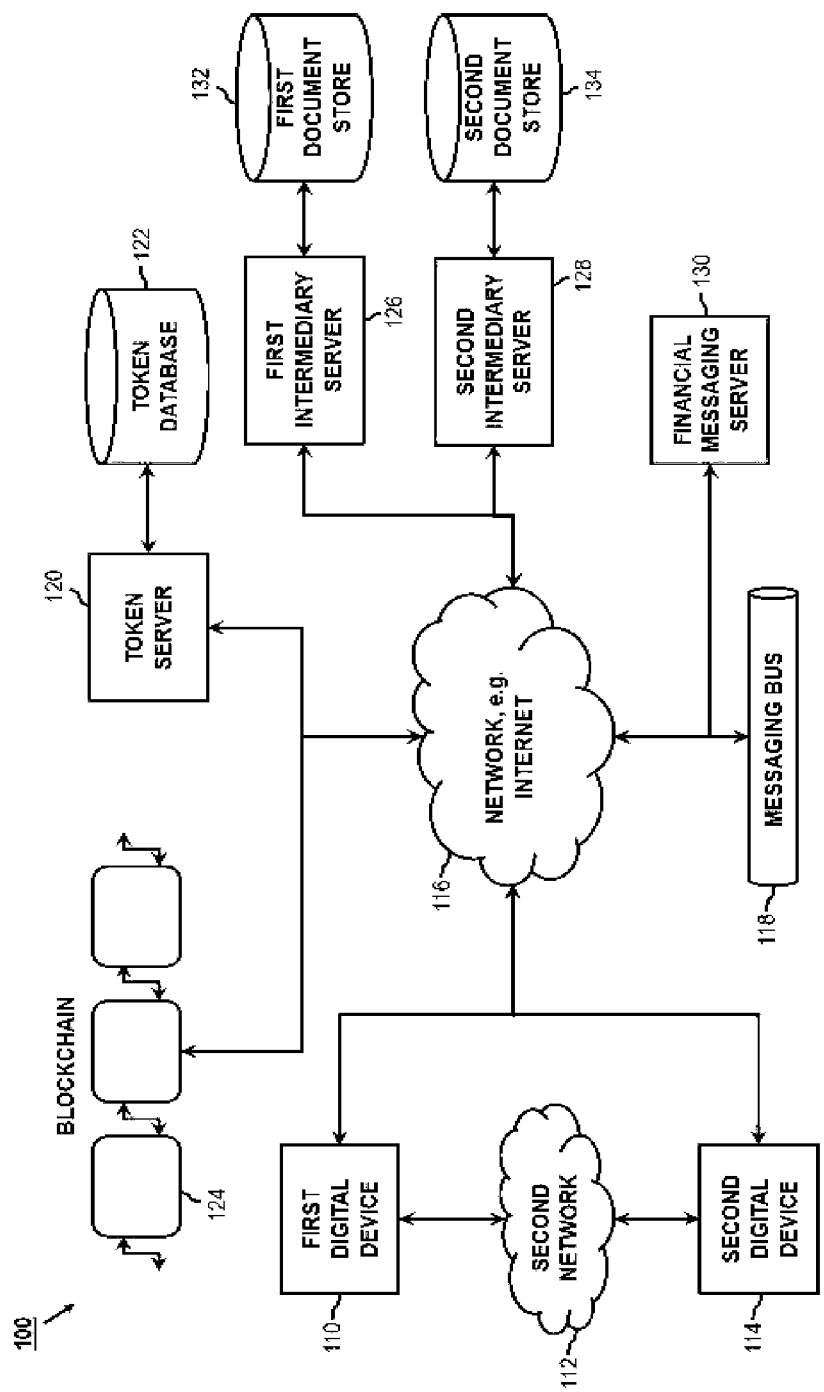
FIG. 1 illustrates a top level diagram of a system of computing devices to which various embodiments described herein may be implemented.

It should be noted in the following description that like or the same reference numerals in different embodiments denote the same or similar features.

System 100 of Computing Devices

FIG. 1 shows a system 100 of computing devices adapted for implementation of various embodiments of the present invention.

As such, the system 100 comprises a first digital device 110 and a second digital device 114 connected to a network 116. According to various embodiments, the first digital device 110 is one of, but not limited to, a mobile phone, a desktop computer, a laptop or a tablet etc. Similarly, according to various embodiments, the second digital device is one of, but not limited to, a mobile phone, a desktop computer, a laptop or a tablet etc. Further, the network 116 is one of, but not limited to, a Wide Area Network (WAN) or a Local Area Network (LAN). Preferably the network 116 is internet. The first digital device 110 and the second digital device 114 are also able to communicate through a second network 112. In one embodiment of the invention, the second network 112 is a telecommunication network such as internet or a mobile telecommunication network. In another embodiment, the second network 112 is a non-telecommunication network such as Bluetooth and Near Field Communication (NFC) etc.

Further, the system 100 comprises a first intermediary server 126 and a second intermediary server 128 connected to the network 116. In one embodiment of the invention, the first intermediary server 126 and the second intermediary server 128 represent a first financial institution and a second financial institution, respectively. In one embodiment of the invention, the respective first and second financial institutions are different branches of different of different banks. In another embodiment, the respective first and second financial institutions are different branches of a single bank. In various other embodiments, the respective first and second financial institutions are, but not limited to, commercial banks, investment banks, brokerages, investment companies etc. It is to be noted that each one of the first intermediary server 126 and the second intermediary server 128 may represent a system of servers comprising web servers, application servers, database servers and gateway servers.

Further, the first intermediary server 126 is operably connected to a first document store 132 and the second intermediary server 128 is operably connected to the second document store 134. In one embodiment, the first document store 132 and the second document store 134 represent databases configured to store a plurality of documents. Each one of the documents comprise data pertaining to a financial transaction and metadata corresponding to the data. In various embodiments, metadata comprises format, encoding, author, hash, verification and relationships to other documents.

Further, the system 100 comprises a financial messaging server 130 connected to the network 116. The financial messaging server 130 provides a financial messaging service between any two intermediary servers, including the first intermediary server 126 and the second intermediary server 128. Some of the examples of financial messaging services include SWIFT (Society for Worldwide Interbank Financial Telecommunication) for cross border transactions, ACH (Automated Clearing House) used in USA and RTGS (Real Time Gross Settlement) used in India and Hong Kong.

Further, the system 100 comprises a token server 120 connected to the network 116 and a token database 122. Further, a blockchain 124 is connected to the network 116. Further, a messaging bus 118 is connected to the network 116. The messaging bus 118 represents a messaging server or a system of messaging servers configured to enable a plurality of applications/servers/devices to communicate with each other. In one embodiment, the messaging bus 118 also comprises an authentication/authorization server for authorizing the computing devices communicating through the messaging bus 118. The detailed configuration of the messaging bus 118 has been described in the discussion to follow.

Also, a blockchain 124 is connected to the network 116. The configuration and/or the functioning of the first intermediary server 126, the second intermediary server 128, the first document store 132, the second document store 134, the token server 120, the token database 122, the blockchain 124, and the messaging bus 118 has been described below in a description. The system 100 for processing a financial transaction involves subsystems of the computing devices, which have been depicted by means of figures and description as following. The description below has been explained with embodiments comprising a financial transaction between a first user and a second user. In some embodiments, the first user acts as a biller/beneficiary/payee and the second user acts as purchaser/payer. In other embodiments, the first user acts as a payer and the second user acts as a payee/beneficiary. Further, it is to be noted that the first user and the second user may represent any number of entities involved in the financial transaction.

In one embodiment of the invention, the first user may instruct the first intermediary sever 126 to process the financial transaction. In one embodiment, the financial transaction involves generation of an invoice for the second user and receiving a payment from the second user, by the first user. In another embodiment, the financial transaction involves making the payment to the second user, by the first user. Specifically, the first user connects with the first intermediary server 126 through the network 116, using the first digital device 110.

Figure 2:
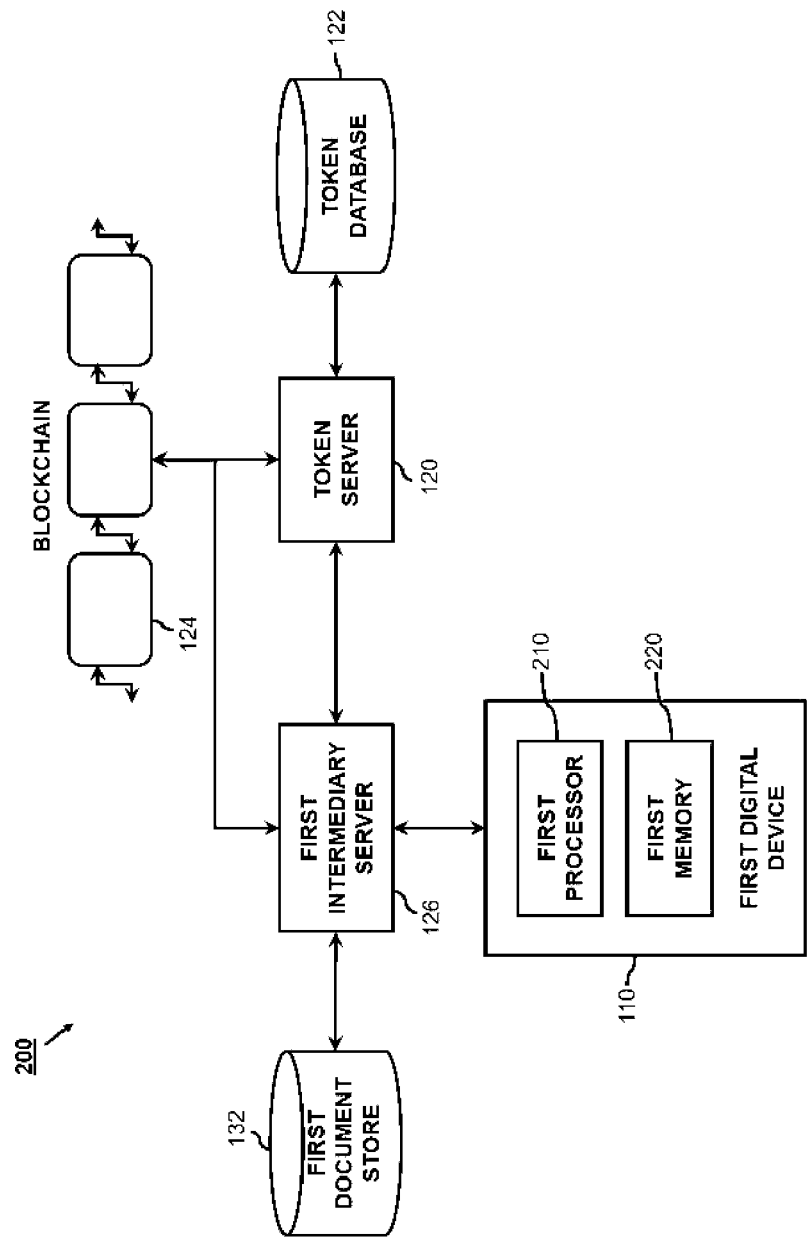
FIG. 2 illustrates a subsystem of the computing devices for generation of a token, in accordance with a preferred embodiment of the present invention.

FIG. 2 illustrates a subsystem (200) of the computing devices for generation of a token, in accordance with a preferred embodiment of the present invention. As shown in FIG. 2, the first digital device 110 comprises a first processor 210 operably connected to a first memory 220. The first memory 220 comprises a first computer program code, the first computer program code when executed by the first processor 210 instructs the first processor 210 to instruct the first intermediary server 126 to process the financial transaction. Further, in one embodiment of the invention, the first computer program code further instructs the first processor 210 to provide one or more documents pertaining to the financial transaction, to the first intermediary server 126. In another embodiment, the one or more documents are already available with the first intermediary server 126. In yet another embodiment, the first intermediary server 126 is configured to generate at least one document from the one or more documents.

The at least one document may be, but is not limited to, a request for processing the financial transaction. The first intermediary server 126 is configured to transmit the one or more documents pertaining to the financial transaction, to the first document store 132. In one embodiment of the invention, the one or more documents comprise payment metadata such as, but not limited to, account numbers of the first user (or a beneficiary), Business Identifier Codes (BIC) of the financial institutions corresponding to the first intermediary server 126 and the second intermediary server 128, amount of currency to be transferred and type of currency etc.

Further, in accordance with an embodiment, the one or more documents comprise one or more first regulatory compliance documents pertaining to the first user. Some examples of the regulatory compliance documents include, but are not limited to purpose of payment documents, a result of sanctions screening and secondary identifiers such as date of birth proof, address proof or other Know Your Customer (KYC) documents.

The first intermediary server 126 is further configured to generate an enriched data record from the one or more documents and add the enriched data record into the blockchain 124. The first intermediary server 126 is configured to generate the enriched data record in multiple ways in multiple embodiments, some of the embodiments have been elucidated below.

In one embodiment of the invention, the first intermediary server 126 is configured to extract a plurality of attributes from the one or more documents. The plurality of attributes may comprise, but are not limited to, originator attributes, beneficiary attributes and purpose of payment etc. Further, the first intermediary server 126 is configured to combine the plurality of attributes to generate the enriched data record. In another embodiment of the present invention, the first intermediary server 126 is configured to extract the plurality of attributes from one or more documents, de-identify the plurality of attributes to obtain a plurality of de-identified attributes and combine the plurality of de-identified attributes to generate the enriched data record. In yet another embodiment of the present invention, the first intermediary server 126 is configured to extract the plurality of attributes from the one or more documents, hash the plurality of attributes to generate a plurality of respective hashes and combine the plurality of hashes to generate the enriched data record.

Further, the blockchain 124 is a data structure comprising a plurality of blocks of data. Each block of data from the plurality of blocks of data represents a single financial transaction. Further, the blockchain 124 is configured to store data pertaining to the financial transaction in association with the token. The data pertaining to the financial transaction includes, but is not limited to, the enriched data record, a plurality of hashes, a plurality of public keys etc. Also the blockchain 124 is configured to return the data pertaining to the financial transaction, when queried using the token.

Further, the first intermediary server 126 is configured to request generation of a token, to the token server 120, via the messaging bus 118. The token server 120 in turn is configured to generate the token and add the token into the blockchain 124. The token is stored in the blockchain 124, in association with the enriched data record. Further, the token server 120 is configured to transmit the token to the first intermediary server 126, via the messaging bus 118. Further, the first intermediary server 126 is configured to transmit the token to the first document store 132. The token is stored in the first document store 132, in association with the one or more documents.

In one embodiment of the invention, the token server 120 is further configured to implement a smart contract and add the smart contract into the blockchain 124. In one embodiment, the smart contract is a shared, signed and verifiable program code which is distributed and/or executed on the blockchain 124. The smart contract would run on the blockchain 124 and would be stored in association with the token.

In one embodiment of the invention, before proceeding any further, the first intermediary server 126 may wish to perform certain "checks", by communicating with the second intermediary server 128, via the messaging bus 118. For enabling communication, the first intermediary server 126 is configured to generate a first asymmetrical pair of a first public key and a first private key. Further, the first intermediary server 126 is configured to add the first public key and a first address of the first intermediary server 126 into the blockchain 124. Similarly, the second intermediary server 128 is configured to generate a second asymmetrical pair of a second public key and a second private key. Further, the second intermediary server 128 is configured to add the second public key and a second address of the second intermediary server 128 into the blockchain 124.

Figure 3:
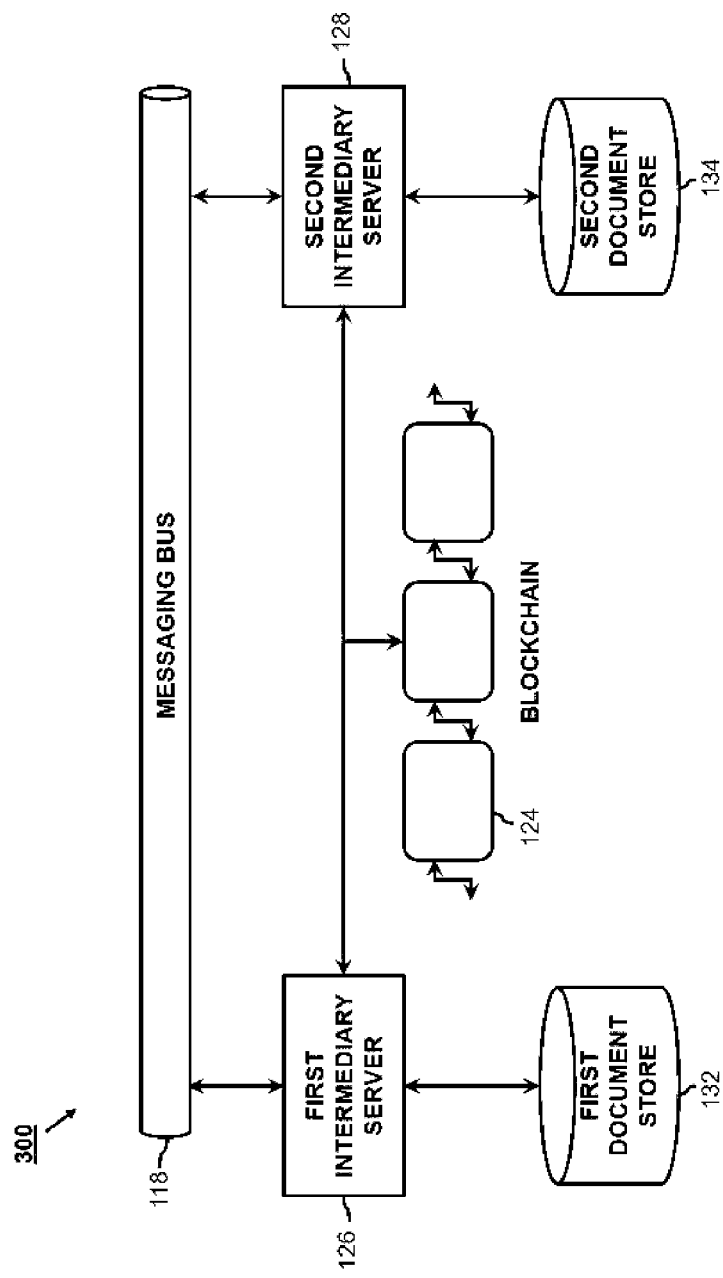
FIG. 3 illustrates a subsystem of the computing devices for exchange of requests and responses between two intermediary servers, via a messaging bus, in accordance with a preferred embodiment of the present invention.

FIG. 3 illustrates a subsystem (300) of the computing devices for exchange of requests and responses between the first intermediary server 126 and the second intermediary server 128, via the messaging bus 118, in accordance with a preferred embodiment of the present invention. During communication with the second intermediary server 128, the first intermediary server 126 is configured to transmit one or more first requests, each comprising the token, to the second intermediary server 128, via the messaging bus 118. Examples of one or more first requests comprise, but are not limited to, KYC check and payment acceptance. In one embodiment of the invention, the the one or more first requests are transmitted on basis of a plurality of predefined criterion. For example, if the first intermediary server 126 is required to make the payment to the second intermediary server 128, the first intermediary server 126 may necessitate KYC check of the second user. The second intermediary server 128 is configured to then receive the one or more first requests from the first intermediary server 126 and transmit the one or more first requests and the token to the second document store 134. In one embodiment of the invention, the one or more first requests are transmitted to the second documents store 134 in form of one or more first request documents.

Further, the second intermediary server 128 is configured to generate one or more first responses, each comprising the token, corresponding to the respective one or more first requests. In one embodiment of the invention, the one or more first responses are generated in form of one or more first response documents at the second intermediary server 128. Further, the second intermediary server 128 is configured to transmit the one or more first responses to the first intermediary server 126, via the messaging bus 118. As an extension of the example above, the second intermediary server 128 may then send a validation successful response to the first intermediary server 126, via the messaging bus 118. In one embodiment of the invention, the one or more first responses comprise one or more second regulatory compliance documents pertaining to a second user.

Further, the second intermediary server 128 is configured to hash the one or more first requests and the one or more first responses to generate one or more first request hashes and one or more first response hashes, respectively. Also, the second intermediary server 128 is configured to add the one or more first request hashes and the one or more first response hashes to the enriched data record in the blockchain 124. The first intermediary server 126 is then configured to receive the one or more first responses and transmit the one or more first responses to the first document store 132. In one embodiment of the invention, the first intermediary server 126 is further configured to hash the one or more first responses to regenerate the one or more first response hashes. Further, the first intermediary server 126 is configured to verify the one or more first response hashes with the blockchain 124, using the token. The first intermediary server 126 can ensure that the one or more first responses are same as the ones generated at the second intermediary server 128.

In one embodiment of the invention, to enable secure transmission, the first intermediary server 126 is configured to encrypt each one of the one or more first requests with the second public key and sign each one of the one or more first requests with the first public key, before transmission to the second intermediary server 128. Consequently, the second intermediary server 128 is configured to decrypt the each one of the one or more first requests with the second private key after reception from the first intermediary server 126. In a similar manner, the second intermediary server 128 is configured to encrypt each one of the one or more first responses with the first public key and sign the each one of the one or more first responses with the second public key, before transmission to the first intermediary server 126. Consequently, the first intermediary server 126 is configured to decrypt each one of the one or more first responses with the first private key after reception from the second intermediary server 128.

The second intermediary server 128 may also request certain compliance checks. Therefore, the second intermediary server 128 is further configured to transmit one or more second requests, each comprising the token, to the first intermediary server 126, via the messaging bus 118. Examples of the one or more second requests comprise, but are not limited to, sender sanctions screening check. The first intermediary server 126 is in turn configured to receive the one or more second requests and transmit the one or more second requests to the first document store 132. In one embodiment of the invention, the one or more second requests are transmitted to the first document store 132 in form of one or more second request documents. Further the first intermediary server 126 is configured to generate one or more second responses, each comprising the token, corresponding to the respective one or more second requests. In one embodiment of the invention, the one or more second responses are generated in form of one or more second response documents. Further, the first intermediary server 126 is configured to transmit the one or more second responses to the second intermediary server 128, via the messaging bus 118. In one embodiment of the invention, the one or more second responses comprise the one or more first regulatory compliance documents pertaining to the first user.

Further, the first intermediary server 126 is configured to hash the one or more second requests and the one or more second responses to generate one or more second request hashes and one or more second response hashes, respectively. Further, the first intermediary server 126 is configured to add the one or more second request hashes and the one or more second response hashes to the enriched data record in the blockchain 124. The second intermediary server 128 is in turn configured to receive the one or more second responses and transmit the one or more second responses to the second document store 134. In one embodiment of the invention, the second intermediary server 128 is further configured to hash the one or more second responses to regenerate the one or more second response hashes and verify the one or more second response hashes with the blockchain 124, using the token. Thus ensuring that the one or more second responses are same as those generated at the first intermediary server 126.

In one embodiment of the invention, to enable secure communication, the second intermediary server 128 is configured to encrypt each one of the one or more second requests with the first public key and sign each one of the one or more second requests with the second public key, before transmission to the first intermediary server 126. Consequently, the first intermediary server 126 is configured to decrypt the each one of the one or more second requests with the first private key after reception from the second intermediary server 128. In a similar manner, the first intermediary server 126 is configured to encrypt each one of the one or more second responses with the second public key and sign the each one of the one or more second responses with the first public key, before transmission to the second intermediary server 128. Consequently, the second intermediary server 128 is configured to decrypt the each one of the one or more second responses with the second private key after reception from the first intermediary server 126.

The requests and the responses are transmitted in a secure manner across the messaging bus 118, in form of a plurality of messages. It is to be noted that each one of the plurality of messages comprises a content hash of all its contents to ensure that the contents have not been altered during transmission. The request and/or receipt time of the recipient public key are also attached to the plurality of messages. This ensures only recipient can see message contents & ensures revocability of public keys.

In one embodiment of the invention, the first intermediary server 128 is further configured to assign a payment risk rating to the token. In one embodiment of the invention, the payment risk rating is assigned to the token at the first intermediary server 126 after completion of the communication with the second intermediary server 128. The payment risk rating provides a pointer to the regulatory and other compliance checks performed by the first intermediary server 126 and the second intermediary server 128. In one embodiment of the invention, the first intermediary server 126 is further configured to add the payment risk rating to the enriched data record in the blockchain 124. Further, the blockchain 124 is configured to return the payment risk rating when queried with the token. The payment risk rating enables better straight through processing by reducing exceptions and false positives.

Figure 4:
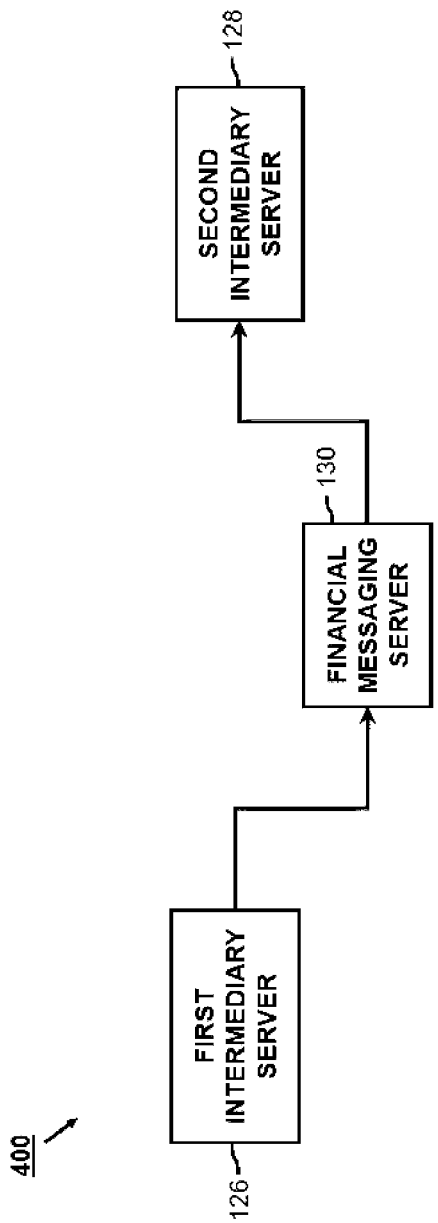
FIG. 4 illustrates a subsystem of the computing devices for making a payment to a second user, by a first user, in accordance with a preferred embodiment of the present invention.

The token thus generated may be used to make the payment to the second user by the first user or making the payment to the first user, by the second user. FIG. 4 illustrates a subsystem (400) of the computing devices for making the payment to the second user, by the first user. As shown in the FIG. 4, the first intermediary server 126 is configured to send a first financial message comprising the token, to the second intermediary server 128, indicative of making the payment to the second user. The first financial message is sent through the financial messaging server 130.

Figure 5:
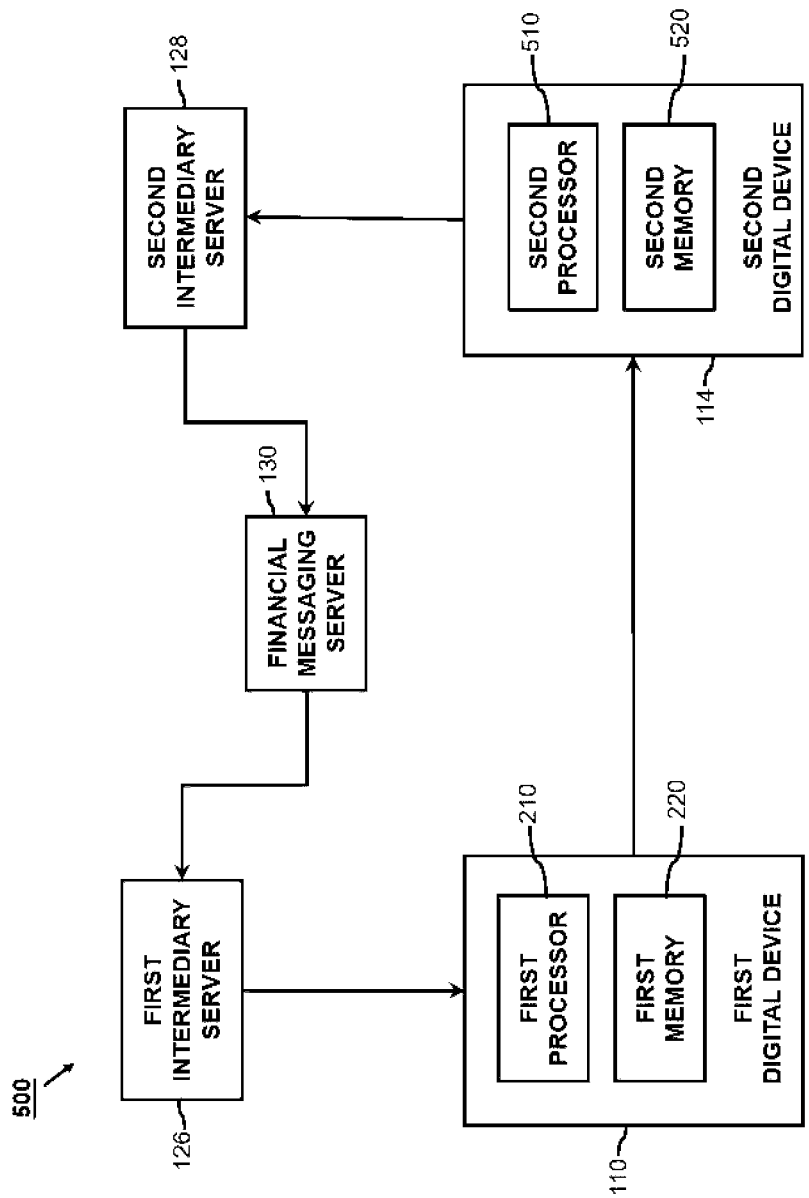
FIG. 5 illustrates a subsystem of the computing devices for making a payment to the first user, by the second user, in accordance with a preferred embodiment of the present invention.
Figure 6:
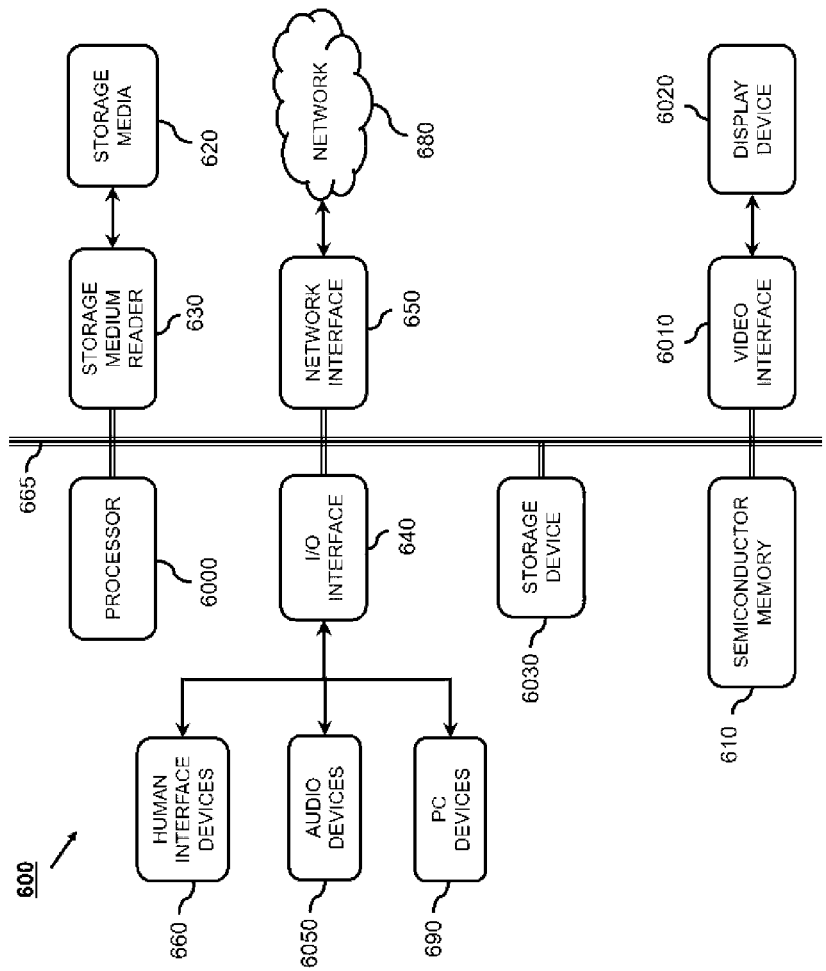
FIG. 6 illustrates a computing device to which various embodiments described herein may be implemented.

FIG. 5 illustrates a subsystem (500) of computing devices for making the payment to the first user, by the second user. As shown in the FIG. 5, the first intermediary server 126 is further configured to transmit the token to the first digital device 110. In turn, the first computer program code instructs the first processor 210 to receive the token from the first intermediary server 126. In one embodiment of the invention, the first processor 210 is further instructed to provide the token to the second digital device 114 via the network 116 or the second network 112. The second digital device 110 comprises a second memory 520 and a second processor 510 operably connected to the second memory 520, the second memory 520 comprising a second computer program code, the second computer program code when executed by the second processor 510, instructs the second processor 510 to receive the token from the first digital device 110 and provide the token to the second intermediary server 128.

In turn the second intermediary server 128 is configured to receive the token from the second digital device 114, transmit the token to the second document store 134 and send a second financial message comprising the token, to the first intermediary server 126, indicative of making the payment to the first user. Further, the second financial message is sent through the financial messaging server 130.

Computing Device

FIG. 56 shows a computing device 600. In a preferred embodiment, the computing device 600 takes the form of the first intermediary server 126, the second intermediary server 128, the token server 120 and the financial messaging server 190 as described above. In this manner, the computing device 500 is adapted to comprise functionality for communication with the network 116, storage capability (such as the token database 122) for storing a plurality of tokens and respective creators of the plurality of tokens.

However, it should be noted that each one first digital device 110 and the second digital device 114, as shown in FIG. 1, may also be depicted as the computing device 600. In this manner, the computing device may comprise differing technical integers, such as the display device 6020, one or more human interface devices 660 and the like. In other words, the technical integers of the computing device 500 is shown in FIG. 5 are exemplary only and variations, adaptations and the like may be made thereto within the purposive scope of the embodiments described herein and having regard for the particular application of the computing device 600.

In particular the steps of the computer implemented method for processing of a financial transaction, as described in further detail below, may be implemented as computer program code instructions executable by the computing device 600. The computer program code instructions may be divided into one or more computer program code instruction libraries, such as dynamic link libraries (DLL), wherein each of the libraries performs a one or more steps of the computer implemented method. Additionally, a subset of the one or more of the libraries may perform graphical user interface tasks relating to the steps of the computer implemented method.

The device 600 comprises semiconductor memory 610 comprising volatile memory such as random access memory (RAM) or read only memory (ROM). The memory 600 may comprise either RAM or ROM or a combination of RAM and ROM.

The device 600 comprises a computer program code storage medium reader 630 for reading the computer program code instructions from computer program code storage media 620. The storage media 620 may be optical media such as CD-ROM disks, magnetic media such as floppy disks and tape cassettes or flash media such as USB memory sticks.

The device further comprises I/O interface 640 for communicating with one or more peripheral devices. The I/O interface 640 may offer both serial and parallel interface connectivity. For example, the I/O interface 640 may comprise a Small Computer System Interlace (SCSI), Universal Serial Bus (USB) or similar I/O interlace for interfacing with the storage medium reader 630. The I/O interface 640 may also communicate with the one or more human interlace devices (HID) 660 such as keyboards, pointing devices, joysticks and the like. The I/O interface 640 may also comprise a computer to computer interface, such as a Recommended Standard 232 (RS-232) interface, for interfacing the device 600 with one or more personal computer (PC) devices 690. The I/O interface 640 may also comprise an audio interface for communicate audio signals to one or more audio devices 6050, such as a speaker or a buzzer.

The device 600 also comprises a network interface 650 for communicating with one or more computer networks 680. The network 680 may be a wired network, such as a wired Ethernet™ network or a wireless network, such as a Bluetooth™ network or IEEE 802.11 network. The network 680 may be a local area network (LAN), such as a home or office computer network, or a wide area network (WAN), such as the Internet or private WAN.

The device 600 comprises an arithmetic logic unit or processor 6000 for performing the computer program code instructions. The processor 6000 may be a reduced instruction set computer (RISC) or complex instruction set computer (CISC) processor or the like. The device 600 further comprises a storage device 6030, such as a magnetic disk hard drive or a solid state disk drive.

Computer program code instructions may be loaded into the storage device 6030 from the storage media 620 using the storage medium reader 630 or from the network 680 using network interface 650. During the bootstrap phase, an operating system and one or more software applications are loaded from the storage device 6030 into the memory 610. During the fetch-decode-execute cycle, the processor 6000 fetches computer program code instructions from memory 610, decodes the instructions into machine code, executes the instructions and stores one or more intermediate results in memory 600.

In this manner, the instructions stored in the memory 610, when retrieved and executed by the processor 6000, may configure the computing device 600 as a special-purpose machine that may perform the functions described herein.

The device 600 also comprises a video interface 6010 for conveying video signals to a display device 6020, such as a liquid crystal display (LCD), cathode-ray tube (CRT) or similar display device.

The device 600 also comprises a communication bus subsystem 665 for interconnecting the various devices described above. The bus subsystem 665 may offer parallel connectivity such as Industry Standard Architecture (ISA), conventional Peripheral Component Interconnect (PCI) and the like or serial connectivity such as PCI Express (PCIe), Serial Advanced Technology Attachment (Serial ATA) and the like.

Embodiments of the Method

Figure 7:
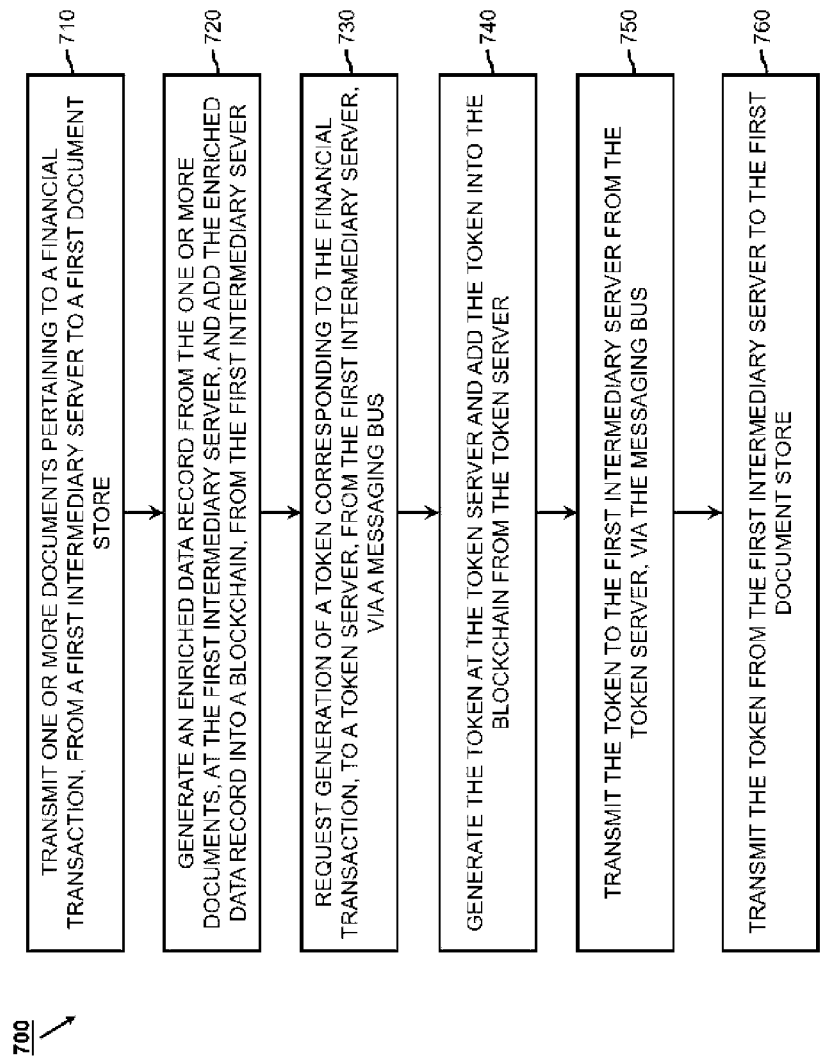
FIG. 7 illustrates a computer implemented method for processing a financial transaction, in accordance with a preferred embodiment of the present invention.

FIG. 7 illustrates a computer implemented method 700 for processing a financial transaction in accordance with an embodiment of the present invention. As described above, the financial transaction is assumed to be taking place between the first user and the second user. The method begins at step 710 by transmitting the one or more documents pertaining to the financial transaction, from the first intermediary server 126 to the first document store 132. In one embodiment of the invention, the one or more documents are provided to the first intermediary server 126 by the first user, from the first digital device 110. In another embodiment, the one or more documents are already available with the first intermediary server 126. In yet another embodiment, the at least one document from the one or more documents is generated at the first intermediary server 126.

At step 720, the enriched data record is generated from the one or more documents, at the first intermediary server 126. Further, the enriched data record is added into the blockchain 124, from the first intermediary server 126. The enriched data record may be generated in different manners in different embodiments. Some of the embodiments have been discussed below.

In one embodiment of the invention, the plurality of attributes are extracted from the one or more documents, at the first intermediary server 126. Further, the plurality of attributes are combined to generate the enriched data record at the first intermediary server 126.

In another embodiment, the plurality of attributes are extracted from the one or more documents, at the first intermediary server 126. Further, the plurality of attributes are de-identified to obtain the plurality of de-identified attributes at the first intermediary server 126. The de-identification of the plurality of attributes comprises removal of any information from the plurality of attributes which may link the plurality of attributes to the first user or the second user. This is to ensure the confidentiality of the first user and the second user, in case the enriched data record is accessed through illegal routes. The plurality of de-identified attributes are then combined, at the first intermediary server 126, to generate the enriched data record.

In yet another embodiment, the plurality of attributes are extracted from the one or more documents, at the first intermediary server 126. Further, the plurality of attributes are hashed to generate the plurality of respective hashes, at the first intermediary server 126. The plurality of hashes are then combined to generate the enriched data record, at the first intermediary server 126.

At step 730, the token server 120 is requested to generate the token corresponding to the financial transaction, from the first intermediary server 126, via the messaging bus 118. At step 740, the token is generated at the token server 120. Further, the token is added into the blockchain 124, from the token server 120. At step 750, the token is transmitted from the token server 120 to the first intermediary server 126. At step 760, the token is transmitted from the first intermediary server 126 to the first document store 132. Further, the token is stored in association with the one or more documents, in the first document store 132.

In one embodiment of the invention, the smart contract is implemented at the token server 120. Further, the smart contract is added into the blockchain, from the token server 120.

In one embodiment of the invention, the first intermediary server 126 communicates with the second intermediary server 128, via the messaging bus 118. The communication may take place for verification and validation of the first user and the second user. In one embodiment of the invention, the first asymmetrical pair of the first public key and the first private key is generated at the first intermediary server 126. Further, the first public key and the first address of the first intermediary server 126 are added into the blockchain 124, from the first intermediary server 126. Similarly, the second asymmetrical pair of the second public key and the second private key is generated at the second intermediary server. Further, the second public key and the second address of the second intermediary server 128 are added into the blockchain 124, from the second intermediary server 128.

In one embodiment, during communication, the one or more first requests, each comprising the token, are transmitted from the first intermediary server 126 to the second intermediary server 128, via the messaging bus 118. Further, the one or more first requests are received at the second intermediary server 128 and the one or more first requests and the token are transmitted from the second intermediary server 128 to a second document store 134. Further, one or more first responses, each comprising the token, corresponding to the respective one or more first requests, are generated at the second intermediary server 128. Further, the one or more first responses are transmitted from the second intermediary server 128 to the first intermediary server 126, via the messaging bus 118. Further, the one or more first requests and the one or more first responses are hashed at the second intermediary server 128 to generate one or more first request hashes and one or more first response hashes, respectively. Further, the one or more first request hashes and the one or more first response hashes are added to the enriched data record in the blockchain 124, from the second intermediary server 128. Also, the one or more first responses are received at the first intermediary server 126 and transmitted to the first document store 132.

In one embodiment of the invention, the one or more first responses comprise the one or more second regulatory compliance documents pertaining to the second user. Further, in one embodiment of the invention, the one or more first responses are hashed at the first intermediary server 126 to regenerate the one or more first response hashes. Also, the one or more first response hashes are verified with the blockchain 124 from the first intermediary server 126, using the token.

In one embodiment of the invention, for secure communication, each one of the one or more first requests are encrypted with the second public key and signed with the first public key at the first intermediary server 126, before transmission to the second intermediary server 128. Consequently, the each one of the one or more first requests are decrypted with the second private key at the second intermediary server 128 after reception from the first intermediary server 126. Similarly, each one of the one or more first responses are encrypted with the first public key and signed with the second public key at the second intermediary server 128, before transmission to the first intermediary server 126. Also, consequently, the each one of the one or more first responses are decrypted with the first private key at the first intermediary server 126 after reception from the second intermediary server 128.

Similarly, in the present and various other embodiments, during communication, the one or more second requests, each comprising the token, are transmitted from the second intermediary server 128 to the first intermediary server 126, via the messaging bus 118. Further, the one or more second requests are received at the first intermediary server 126 and the one or more second requests are transmitted from the first intermediary server 126 to the first document store 132. Further, one or more second responses, each comprising the token, corresponding to the respective one or more second requests, are generated at the first intermediary server 126. Further, the one or more second responses are transmitted from the first intermediary server 126 to the second intermediary server 128, via the messaging bus 118. Further, the one or more second requests and the one or more second responses are hashed at the first intermediary server 126 to generate one or more second request hashes and one or more second response hashes, respectively. Further, the one or more second request hashes and the one or more second response hashes are added to the enriched data record in the blockchain 124, from the first intermediary server 126. Also, the one or more second responses are received at the second intermediary server 128 and transmitted to the second document store 134.

In one embodiment of the invention, the one or more second responses comprise the one or more first regulatory compliance documents pertaining to the first user. Further, in one embodiment, the one or more second responses are hashed at the second intermediary server 128 to regenerate the one or more second response hashes. Also, the one or more second response hashes are verified with the blockchain 124 from the second intermediary server 128, using the token.

In one embodiment of the invention, for secure communication, each one of the one or more second requests are encrypted with the first public key and signed with the second public key at the second intermediary server 128, before transmission to the first intermediary server 126. Consequently, the each one of the one or more second requests are decrypted with the first private key at the first intermediary server 126 after reception from the second intermediary server 128. Similarly, each one of the one or more second responses are encrypted with the second public key and signed with the first public key at the first intermediary server 126, before transmission to the second intermediary server 128, and decrypted with the second private key at the second intermediary server 128 after reception from the first intermediary server 126.

In one embodiment of the invention, the payment risk rating is assigned to the token, at the first intermediary server 126. Further, the payment risk rating is added to the enriched data record in the blockchain 124, from the first intermediary server 126.

In one embodiment, for making the payment to second user, by the first user, the first financial message comprising the token, is sent from the first intermediary server 126 to the second intermediary server 128, indicative of making the payment to the second user. Further, the first financial message is sent via the financial messaging server 130.

In another embodiment, the token is transmitted from the first intermediary server 126 to the first digital device 110, available with the first user. The first processor 210 receives the token from the first intermediary server 126 and stores the token in the first memory 220. Further, the token is provided to the second user, by the first user. In one embodiment, the token is provided to the second user by means of a Quick Response (QR) code printed on an invoice. In another embodiment, the token is provided to the second user at the second digital device 114 available with the second user, from the first digital device 110. The second processor 510 receives the token from the first digital device 110, and stores the token in the second memory 520.

Further, the token is provided to the second intermediary server 128, from the second digital device 114, by the second user. The second computer program code instructs the second processor 510 to provide the token to the second intermediary server. The token is then transmitted to the second document store 134, from the second intermediary server 128. Further, the second financial message is sent from the second intermediary server 128, to the first intermediary server 126, indicative of making the payment to the first user.

Prior Art

Figure 8A:
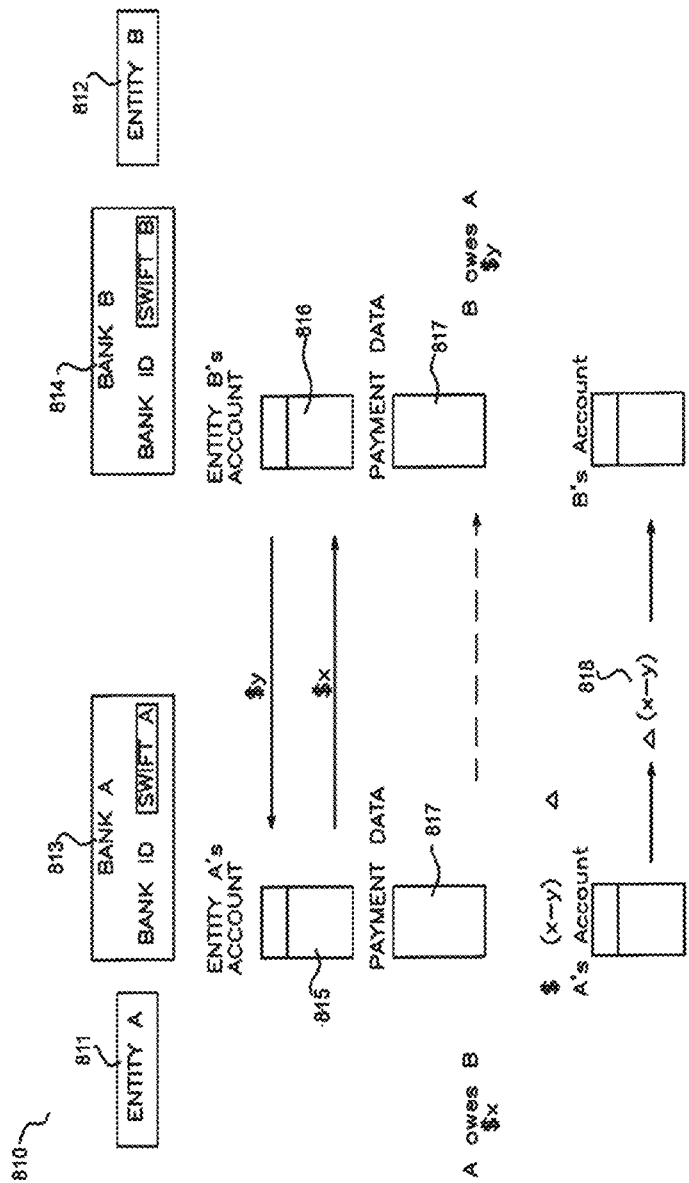
FIG. 8A is a block diagram of the entities and intermediaries involved in a prior art electronic settlement system.

With reference to FIG. 8A there is illustrated in block form the basic components of a prior art settlement system. In many transactions there will be an at least first transacting entity 811 which enters into a financial transaction with an at least second transacting entity 812. The financial transaction may be as simple as the agreement by the first transacting entity 811 to sell a particular item or service to the second transacting entity 812. Typically the financial transaction will require settlement for an agreed amount expressed in a Fiat or other currency. In the vast majority of cases the at least first transacting entity 811 will be associated with an at least first intermediary entity 813, in this instance in the form of a bank A and similarly the second transacting entity 812 will be associated with an at least second intermediary entity 814 in this instance in the form of bank B. The first transacting entity 811 will have a first bank account 815 at the first intermediary entity 813 whilst second transacting entity 812 will have a second bank account 816 at second intermediary entity 814. Settlement of any given transaction requires instruction given by first transacting entity 811 to its first intermediary entity 813 to pay an agreed amount from the first bank account 815 to the bank account comprising second bank account 816 of second intermediary entity 814 of second transacting entity 812. For these instructions to be carried out metadata in the form of payment metadata 817 must be assembled at the first intermediary entity 813 sufficient and exhaustive to communicate to the second intermediary entity 814 such that the agreed settlement amount is transmitted from bank A to bank B and more particularly to the specific accounts of the respective first transacting entity 811 and second transacting entity 812.

A similar transaction may be applied in reverse where the second transacting entity sells a good or service to first transacting entity 811. In such an instance the respective intermediaries, once having received the respective payment metadata 817 and exchanged that metadata 817 may elect to simply pay the difference 818 electronically as between the intermediaries to effect the multiple transactions. In some instances, particularly where the financial transaction is cross-border-for example the first intermediary entity 813 is in a first country whilst the second intermediary entity 814 is in a second country the metadata 817 may include what is known as a Swift code which is a substantially unique identifier for each intermediary entity involved in the financial transaction. However, for any given transaction, far more data than merely a unique identifier for each intermediary entity involved in a financial transaction is required in order for the appropriate settlement amounts to ultimately be recorded in the correct accounts and settle the financial transaction for the agreed amounts.

Figure 8B:
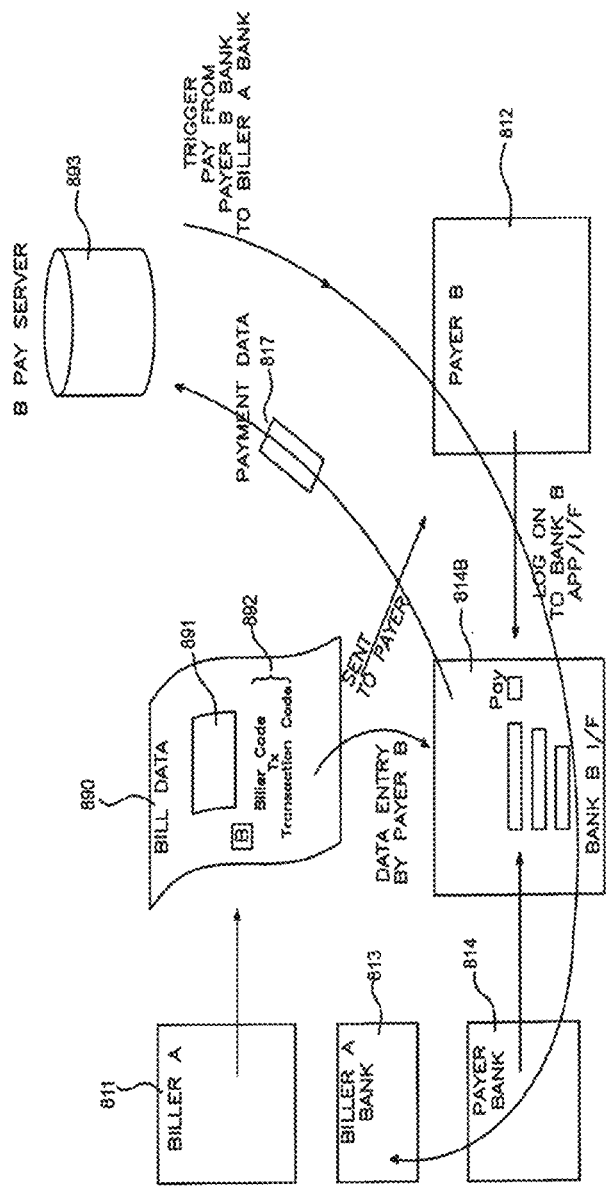
FIG. 8B is a data and funds flow according to a prior art settlement system.

FIG. 8B is a data and funds flow diagram of data and funds flow according to a prior art settlement system at the granular level. In this instance, with reference to FIG. 8B like components are numbered as for FIG. 8A a given transaction requiring settlement can be embodied as a bill 890 which will include payment data 891 and may include bank facilitation payment data 892 comprising, in this instance, a biller code and a financial transaction code. Banks which are party to this bank facilitation payment system permit data entry by entity B (or payer B) 812 into a database of bank B 814 by means of a bank application or web interface 814 B. Bank B may then add additional data to form metadata 817 which is sent to a third-party server 893 which utilises metadata 817 to trigger pay (settlement) of bill 890 from payer B bank 814 to biller A bank 813.

Exemplary Embodiments

Figure 9A:
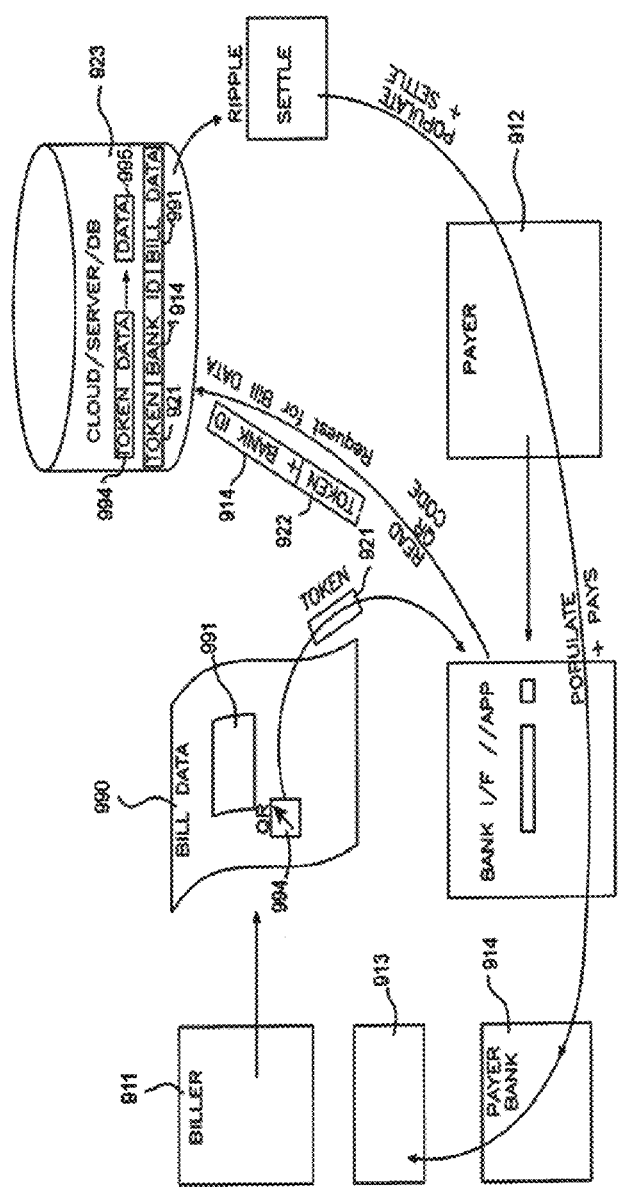
FIG. 9A, 9B is a data and funds flow diagram according to an indicative embodiment of the present invention.
Figure 9B:
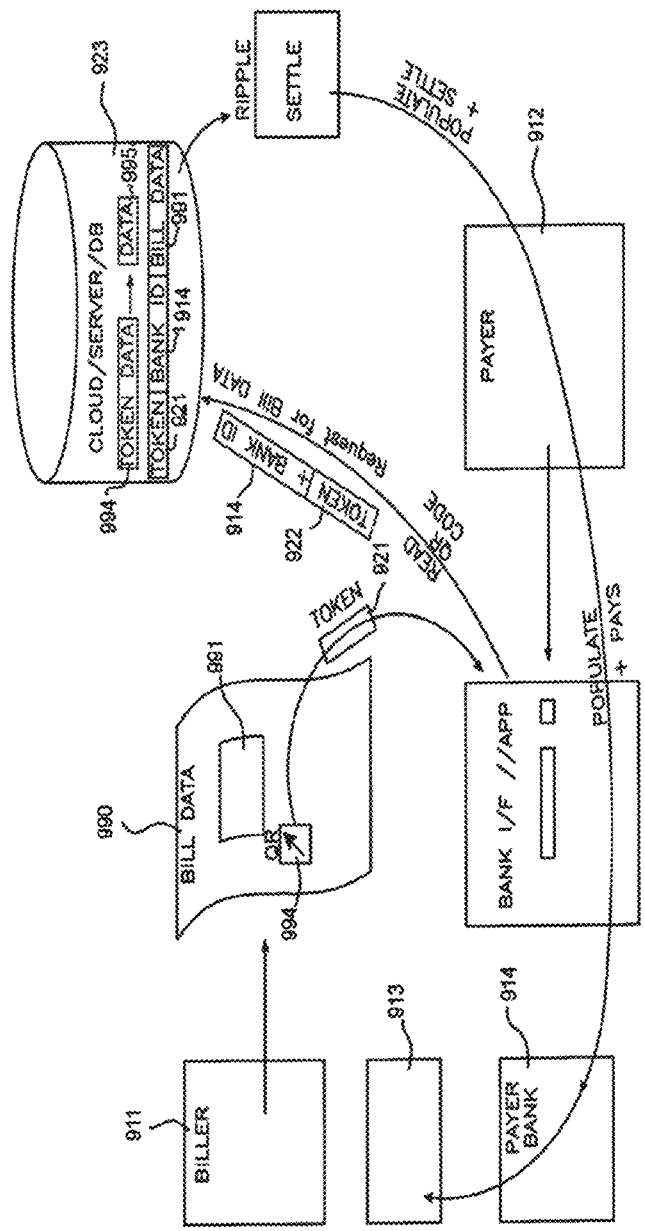
Figure 9C:
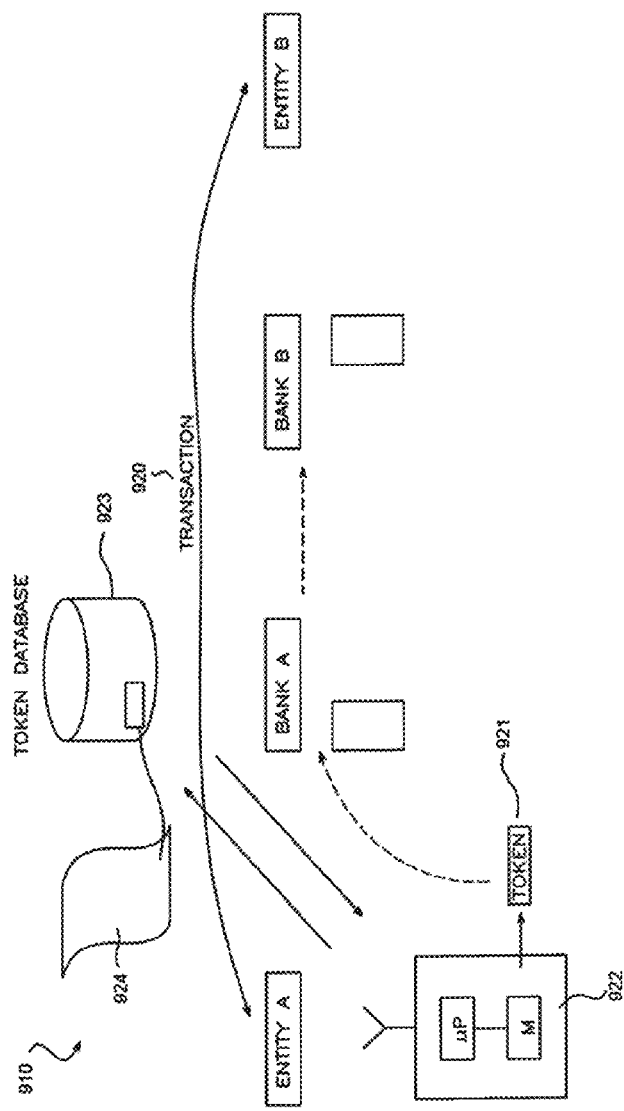
FIG. 9C is a block diagram of the basic infrastructure and components suited for use with embodiments of the present invention.

With reference to FIG. 9C there is illustrated a block diagram of the basic infrastructure and components suited for use with embodiments of the present invention. In this instance like components are numbered as for FIG. 8 except in the 900 series. So, for example, first transacting entity 811 becomes first transacting entity 911 in this embodiment with reference to FIG. 2C.

In this instance a settlement system 910 according to a generalised embodiment includes at least first transacting entity 911 which enters into a financial transaction with at least a second transacting entity 912. As previously these entities are associated with a respective first intermediary entity 913 and a second intermediary entity 914 in the form of bank A and bank B. Each of the first transacting entity 911 and a second transacting entity 912 has a respective account 915, 916 at their respective intermediary entities as illustrated in FIG. 9C In this instance, in the event that first transacting entity 911 enters into a financial transaction with second transacting entity 912 then, at the time of entry into the financial transaction 920, a token 921 is generated. In this instance the token 921 is generated by at least first digital device 922 communicating with a token database 923. The token database 923 generates a token comprising a data file 924 containing all data that will ultimately be required to settle the financial transaction 920 including any necessary identifying information for the transacting entity is, their accounts and the intermediary entities. Settlement is effected by communication of the token 921 to bank A and then to bank B together with the appropriate flow of funds.

With reference to FIG. 9A at the granular level a bill 990 from a biller 911 directed to a payer 912 contains bill data 991 and also token data of a token 921 residing within a code symbol 994 (in this instance a QR code). The token data includes pointer data pointing to data 995 on token database 923. The data 995 combined with bank ID data 914 permits the creation by token database 923 of a full payment record 996 which can be utilised to cause settlement of the bill 990 as against payer 912 via, in this instance, their respective banks 914, 913.

With reference to FIG. 9B the payment data record 996 is utilised has fed into a settlement network such as, for example a network 997 operating under the Ripple protocol thereby permitting substantially real-time settlement across multiple institutions and banks.

With reference to FIG. 10 there is illustrated in block diagram form a first preferred embodiment of the present invention by way of a non-limiting example of a financial transaction. In this embodiment like components are numbered as for the previous embodiments except in the 1000 series. So, for example, token 921 becomes token 1021.

Figure 10A:
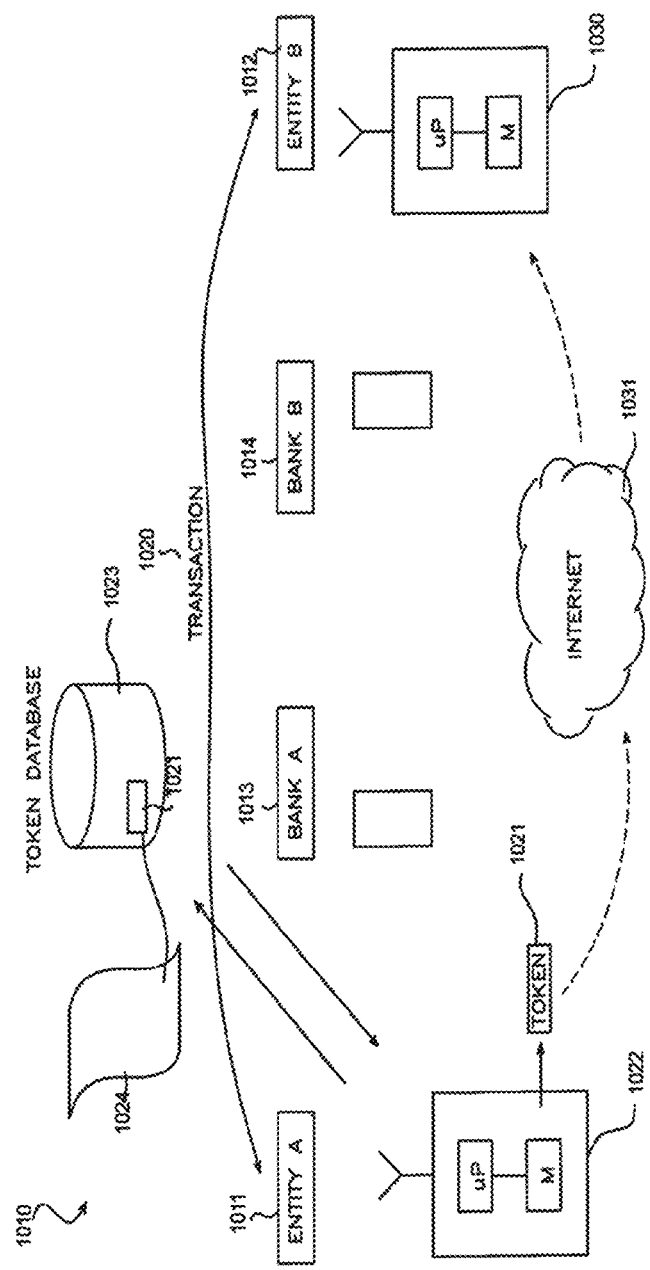
FIG. 10 A, B, C comprise block diagrams of the steps in a settlement transaction in accordance with a first preferred embodiment of the present invention.

With reference to FIG. 10A the financial transaction system 1010 is activated, as for the previous embodiment, when a financial transaction 1020 is entered into between at least first transacting entity 1011 and at least a second transacting entity 1012 each dealing, for the purposes of this transaction, through respective intermediary entities 1013, 1014.

At the time of and as part of entry into the financial transaction 1020 the first transacting entity 1011 accesses token database 1023 via digital device 1022 executing via a web browser interface or via execution of an application running on a portable digital devices such as a mobile telephone or in a further alternative as a point-of-sale terminal in order to arrange for the database 1023 to generate a token 1021. In this instance the token 1021 will include better data 1024 including the recipient named, BIC, IBAN, destination country, mobile number, currency, business type, communication, payment amount. In this instance the token 1021 including the metadata 1024 is stored in the token database 1023. In addition the first transacting entity 1011 communicates the token 1021 to a digital device 1030 associated with second transacting entity 1012. In this instance the communication is by way of initial transmission of the token 1021 to digital device 1022 which then transmits the token via Internet 1031 to digital device 1030.

Figure 10B:
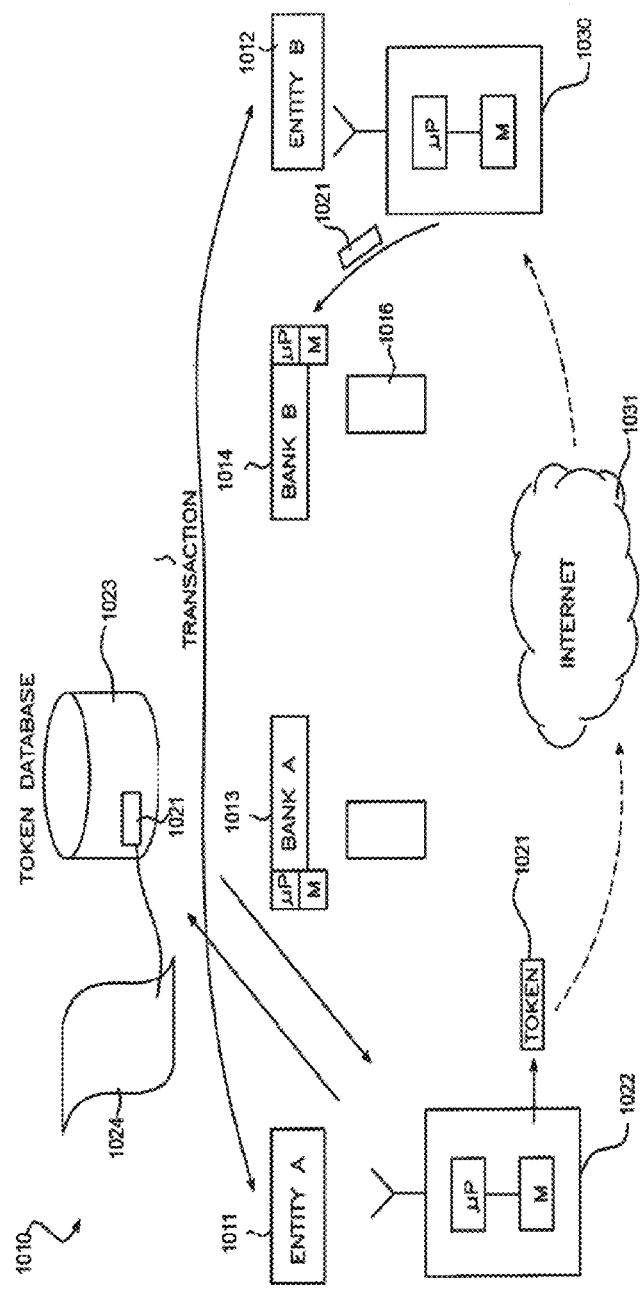

With reference to FIG. 10B, when ready to settle the financial transaction 1020 the second transacting entity 1012 "logs in" to a portal associated with second intermediary entity 1014 and communicates the token 1021. In this instance have the login can be executed via a web browser associated with digital device 1030 which communicates via Internet 1031 the token 1021 to a digital processing system 1032 (including at least a processor and a memory) associated with second intermediary entity 1014. Substantially at the same time as part of seeking to settle the financial transaction 1020:

Notification: token database 1023 notifies second intermediary entity 1014 to contact the token database 1023 from which it receives a further token 1021A.

Verification: token database 1023 communicates with the processing system 1032 of second intermediary entity 1014 to verify that sufficient funds are located in account 1016 as indicated in the meta data 1024 to settle the financial transaction.

Committing payer funds: payers bank debits payers account: payers bank sends notice to payer bank gateway: payers bank gateway calls token database 1023 to get approved token:

Settlement: gateway of payers bank sends by way of non-limiting example XRP (the native currency of the Ripple protocol) to billers bank gateway: payers bank gateway notifies token database 1023 of receipt:

Clearing: payer's bank Nostro account is debited subject to bank institution rules.

Examples of tokenised messages and their generation and transmission are illustrated in pseudocode at the end of the description before the claims. Reference to "sparro" is a reference to an instance of a token databasep23.

features of this embodiment include the enablement of a private, invitation only, network for banking institutions which, in a particular form, can facilitate cross-border payments thereby to enable substantially real-time payments at reduced processing cost.

Figure 11:
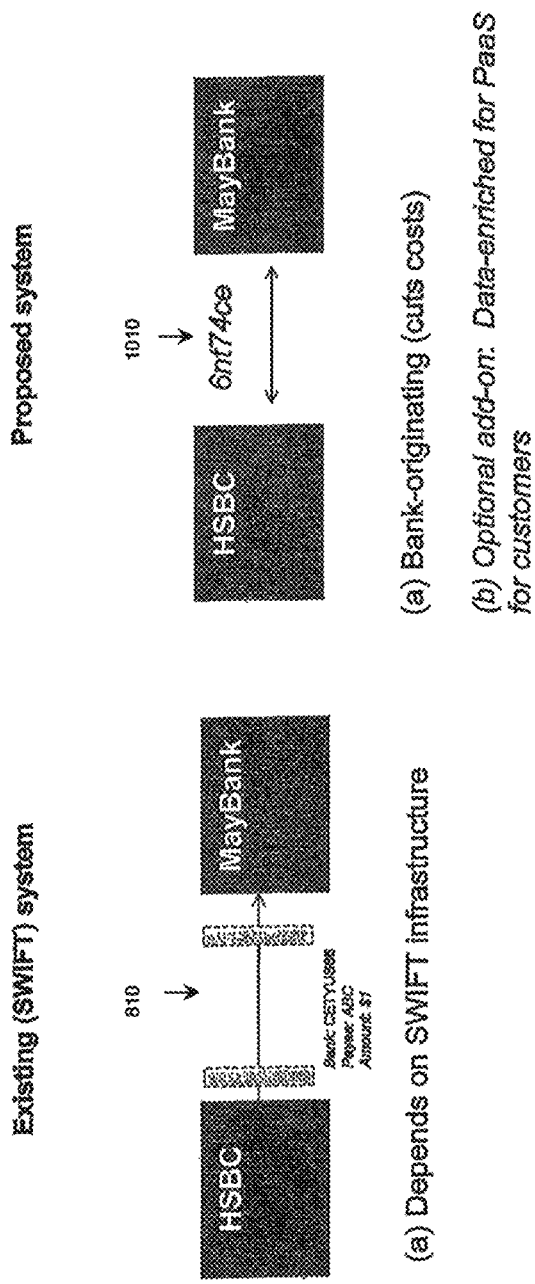
FIG. 11 is a block diagram of salient characteristics of a messaging system 810 of the prior art as compared with the salient messaging characteristics of the system 1010 enabled by the code of a second embodiment.

With reference to FIG. 11 there is shown a block diagram of salient characteristics of a messaging system 810 of the prior art as compared with the salient messaging characteristics of the system 1010 enabled by the code listed above and more broadly described with reference to the earlier embodiments.

Figure 12:
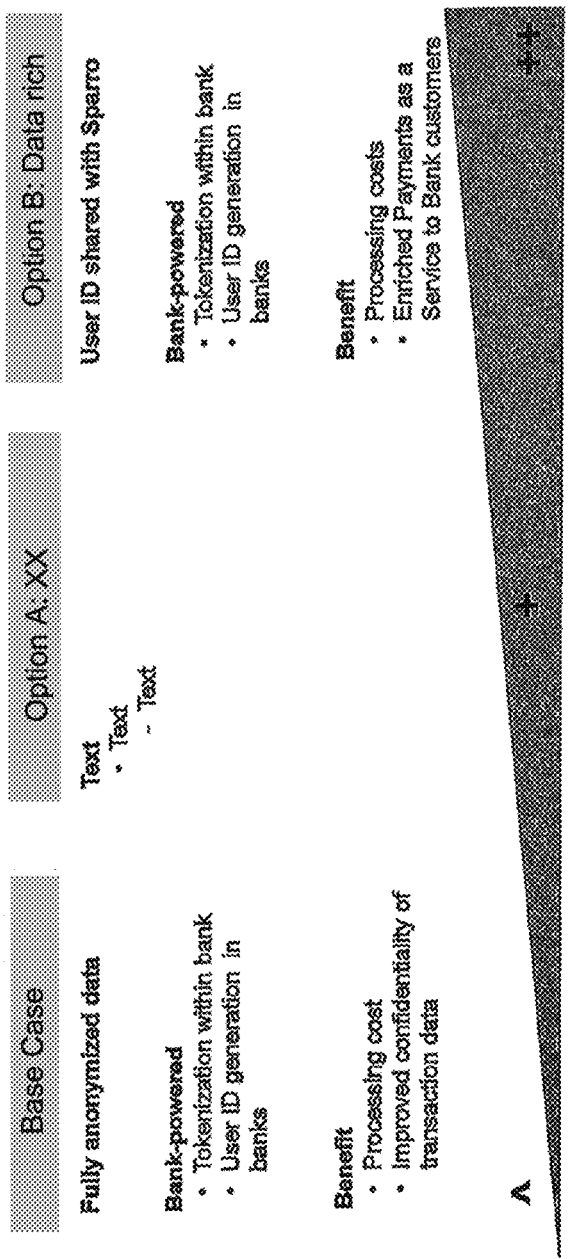
FIG. 12 illustrates the options for data content to be included in tokens in accordance with embodiments of the invention as described above.

FIG. 12 illustrates the options for data content to be included in tokens in accordance with embodiments of the invention as described above.

FIG. 13 provides a comparison of characteristics of embodiments of the present invention as compared with the prior art Swift-based messaging system at a commercial layer 1270, a security layer 1271 and a technical layer 1272

Embodiments of the invention can be implemented utilising the "Ripple" the framework, protocol and gateway-or more generally any blockchain based framework. In a particular form the final settlement process can be enabled through a Ripple frame work thereby to facilitate substantially real-time settlement across multiple institutions and multiple banks.

Figure 14:
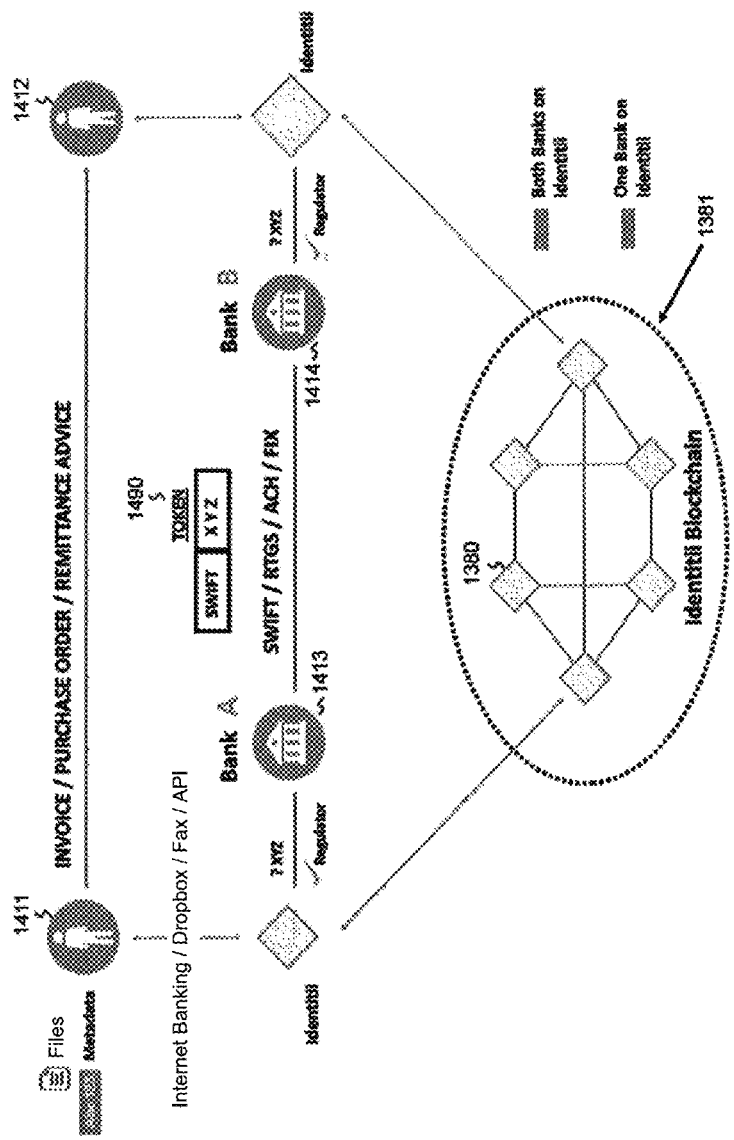
FIG. 14 is a block diagram in accordance with a further preferred embodiment of the present invention.

FIG. 14 is a block diagram of a further embodiment. In this instance a distributed ledger 1381 operating on blockchain principles provides for transmission of the tokenised message as for previous embodiments.

In this instance it will be observed that the tokenised transmission distributed ledger 1381 operates in parallel with conventional transmission between institution A and institution B.

Conventional transmission includes transmission of conventional messages utilising the SWIFT protocol. It is also to be noted that institution A and institution B may be subsidiaries of the same institution or may otherwise be closely related. In the alternative they may be completely independent institutions.

The tokenised message as described in previous embodiments may include information as typically transmitted by the SWIFT or other current acknowledged data transmission systems for transmission of financial information for the purpose of transfer of funds between parties.

The tokenised message may transmit data which includes some of the data normally included in the conventional message. In alternative forms it may include additional data. In yet alternative forms it may include data not transferred at all in the data normally included in the conventional message.

The aim, in particular forms, ultimately, is to improve the reliability of the financial transaction as between the first transacting entity and the second transacting entity and, in some forms, to provide an enhanced capability.

In the arrangement of FIG. 14 the data comprising the tokenised message is transmitted via nodes 1380 within a blockchain 1381.

In summary, Bank A and Bank B might be branches of the same bank, say HSBC HK and HSBC China (which today use SWIFT for intrabank transfers). So this system could be used within 1 financial institution.

In one form the purpose of storing the token only in the blockchain is really to both de-identify the information in the blockchain (which is critical for banks), and enable use of existing (SWIFT/ACH/RTGS) or new messaging systems to send the payment instruction in tokenised format. Banks today have significant investment in existing conventional messaging systems and a complete abandonment of these messaging systems would not be feasible. However settlement is still a manual process so linking the conventional messaging system to the 'blockchain' settlement system (via the token) is an important feature of this embodiment. So, in diagram 7 we include a SWIFT/ACH/RTGS connection between the two Financial Institutions (FIs) (or branches) for communication of the token, and the blockchain ledger is common. The data that is required to settle the payment can be provided by the FI's customer or by the FI themselves (say from a core banking system or similar).

FIG. 15 illustrates in block diagram form key components of an implementation of a blockchain structure which may be utilised to implement the system of FIG. 14.

Each block includes verified transactions and the blockchain maintains a ledger all prior transactions. The blockchain is duplicated by all the computers on a network.

The first block in the chain is known as the Genesis block and new blocks can be added in linear and chronological order. From any given block in the chain the information of this genesis block and all blocks that led back to this one can be retrieved. A blockchain is essentially numerous blocks connected through hash chaining where each block is comprised of the following (see FIG. 15);

Timestamp: provides proof that the data in a block existed at a particular time;

Previous Hash: Essentially a pointer to the previous block;

Merkle Hash: Summary of all executed transactions;

Nonce: Individual blocks identity and is an arbitrary number which can only be used once.

The blockchain is managed by a network of distributed nodes where each node contains a copy of the entire blockchain. Each node in the network can add blocks to the chain, where every node is adding blocks at the same point in the chain at the same time. The more nodes that comprise the network the harder it is to disrupt the storage of the blockchain. Unlike centralised systems which rely on a single authority, there is no single point of failure in these distributed nodes network. If you change the content of a block you change its Hash.

Blockchains can be based on/operate in association with any one of a number of protocols—for example Ripple or Stellar.

Figure 15A:
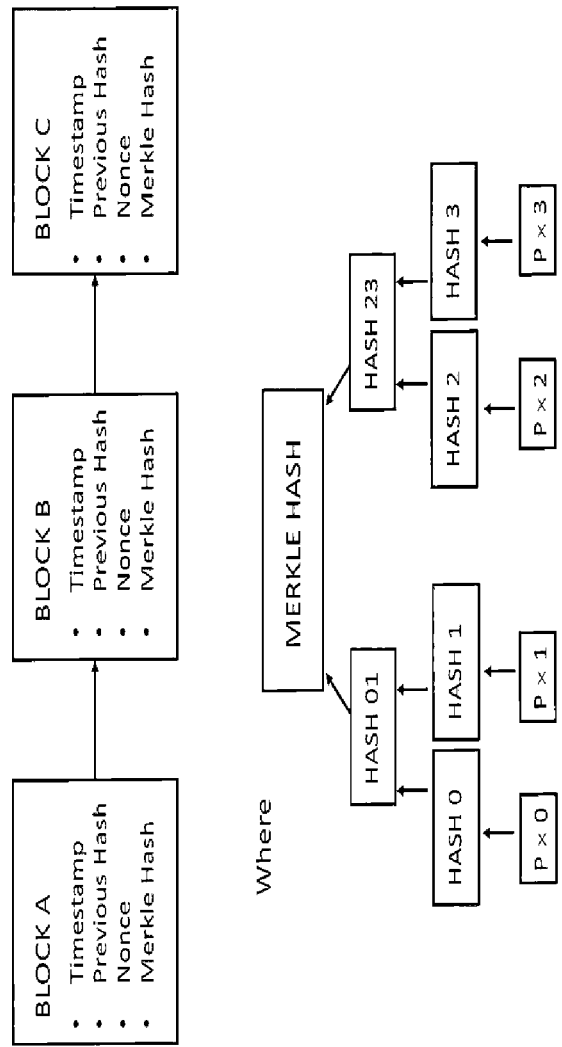
FIGS. 15A and 15B are block diagrams of an implementation of a blockchain arrangement suitable for use with the system of embodiments of the invention.
Figure 15B:
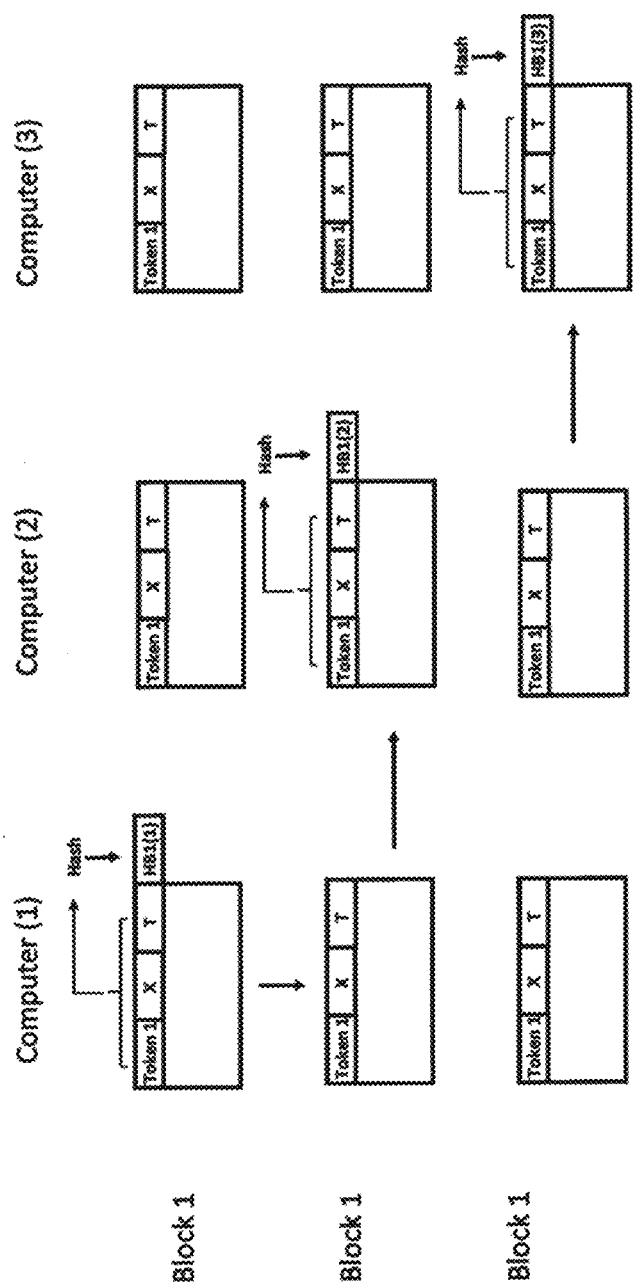

FIG. 15B shows a first step in creation of records in the block chain structure of FIG. 15A whilst FIG. 15C shows a second step in the creation of records in the chain structure of FIG. 15A. The chain structures of this type may be utilised in relation to the embodiments described in this application.

Figure 16:
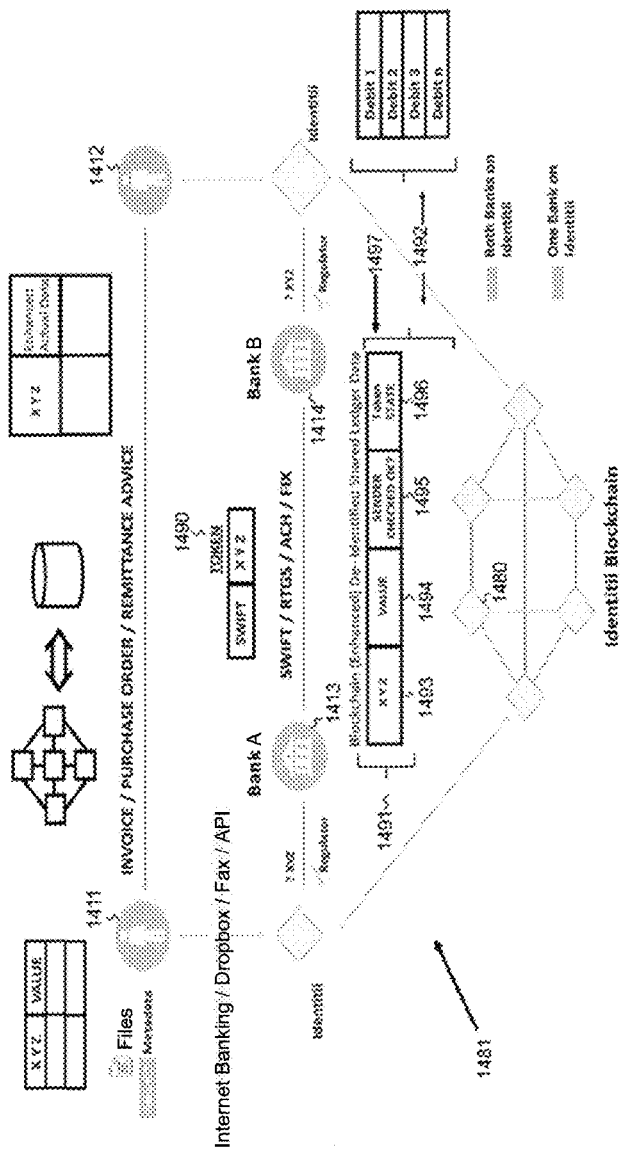
FIG. 16 is a block diagram in accordance with yet a further preferred embodiment of the present invention.

FIG. 16 is a block diagram of a further embodiment wherein the parallel data transmission capabilities of the system are further detailed as compared with the embodiment of FIG. 14. Components are numbered as for previous embodiments except in the 1400 series. So, for example, first transacting entity 1311 of the further embodiment of FIG. 14 becomes the first transacting entity 1411. In this instance a distributed ledger 1481 operating on blockchain principles (refer description with reference to FIG. 15) provides for transmission of the tokenised message as for previous embodiments.

In this instance it will be observed that the tokenised transmission distributed ledger 1481 operates in parallel with conventional transmission between institution A and institution B.

Conventional transmission includes transmission of conventional messages utilising the SWIFT protocol. It is also to be noted that institution A 1413 and institution B 1414 may be subsidiaries of the same institution or may otherwise be closely related. In the alternative they may be completely independent institutions.

The tokenised message 1490 as described in previous embodiments may include information as typically transmitted by the SWIFT or other current acknowledged data transmission systems for transmission of financial information for the purpose of transfer of funds between parties.

The tokenised message may transmit data which includes some of the data normally included in the conventional message. In alternative forms and more particularly the form with reference to FIG. 16 it may include additional data however, in this instance the additional data 1491 is transmitted via blockchain 881 as an entry in a shared ledger 1492. The additional data 1491 in this instance comprises a token value 1493, a financial transaction value 1494 a sender cheque status flag 895 and a token state 1496. This entry 1497 in shared ledger 1492 can be accessed based on token value 1493. In an alternative form the entry 1497 and more particularly the token value 1493 may be secured for example requiring a separate key before the data can be accessed and/or decrypted. The data in entry 1497 may comprise deidentified data thereby to ensure that no personally identifiable information is transmitted to Bank (second intermediary entity 1414).

The aim, ultimately, is to improve the reliability of the financial transaction as between the first transacting entity and the second transacting entity and, in some forms, to provide an enhanced capability.

In particular, in preferred forms an element includes provision of systems which add additional information whereby the additional information is to enrich payments with more information given the inability of existing payment systems to communicate enriched information.

In the arrangement of FIG. 16 the data comprising the tokenised message is transmitted via nodes 1480 within a blockchain 1481.

In summary, Bank A and Bank B might be branches of the same bank, say HSBC HK and HSBC China (which today use SWIFT for intrabank transfers). So this system could be used within 1 financial institution.

In one form the purpose of storing the token only in the blockchain is really to both de-identify the information in the blockchain (which is critical for banks), and enable use of existing (SWIFT/ACH/RTGS) or new messaging systems to send the payment instruction in tokenised format. Banks today have significant investment in existing conventional messaging systems and a complete abandonment of these messaging systems would not be feasible. However settlement is still a manual process so linking the conventional messaging system to the 'blockchain' settlement system (via the token) is an important feature of this embodiment. So, in FIG. 16 we include a SWIFT/ACH/RTGS connection between the two Financial Institutions (FIs) (or branches) for communication of the token, and the blockchain ledger is common. The data that is required to settle the payment can be provided by the FI's customer or by the FI themselves (say from a core banking system or similar).

Figure 10C:
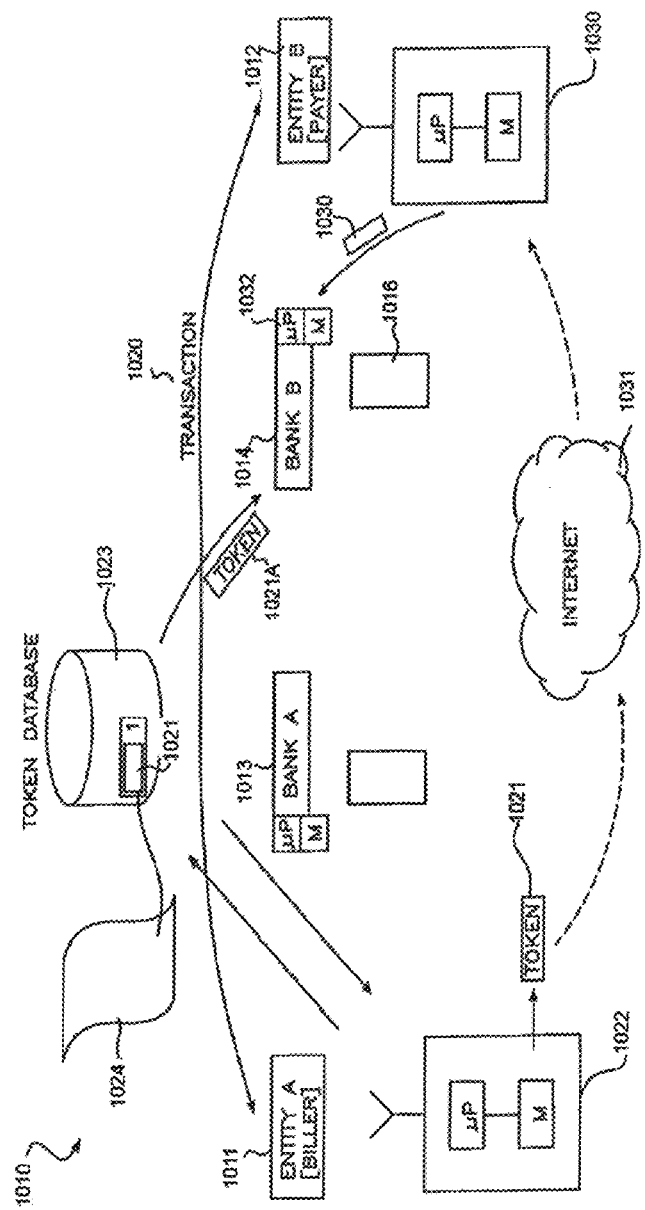
Figure 17:
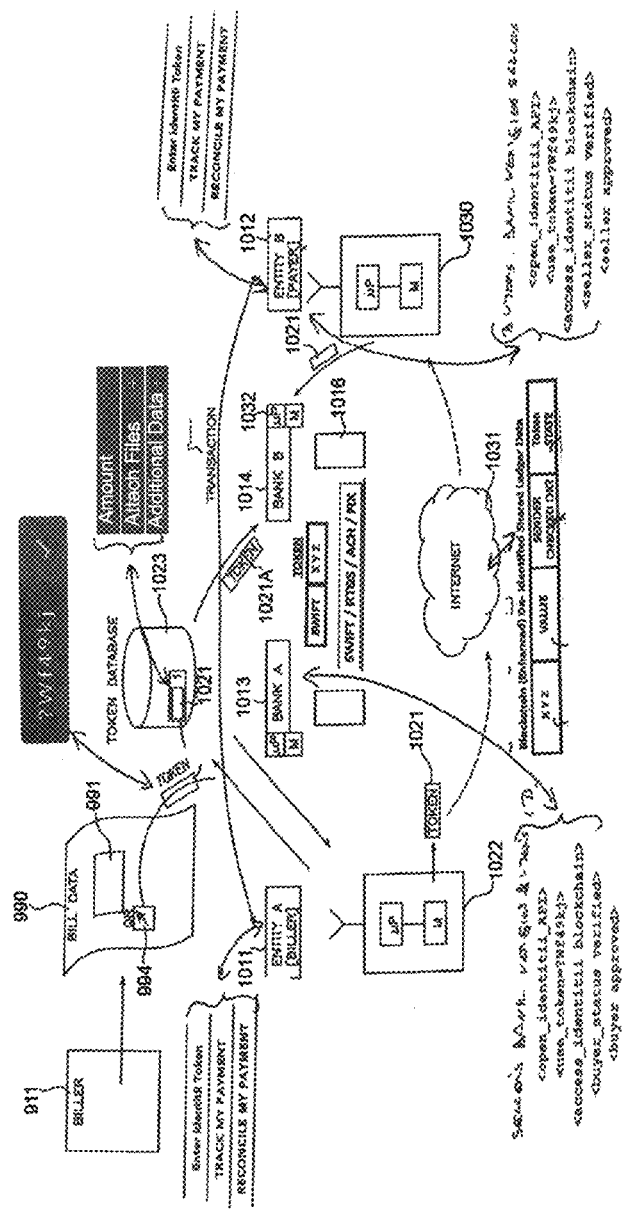
FIG. 17 is a detailed block diagram of the system of FIG. 10C and FIG. 16.

FIG. 17 is a detailed block diagram of the system of FIG. 10C and FIG. 16.

With reference to FIG. 17 there is illustrated in block diagram form a first preferred embodiment of the present invention by way of a non-limiting example of a financial transaction. In this embodiment like components are numbered as for FIG. 16 in the 1400 series.

With reference to FIG. 17 the financial transaction system 1010 is activated, as for the previous embodiment, when a financial transaction 1020 is entered into between at least first transacting entity 1011 and at least a second transacting entity 1012 each dealing, for the purposes of this transaction, through respective intermediary entities 1013, 1014.

At the time of and as part of entry into the financial transaction 1020 the first transacting entity 1011 accesses token database 1023 via digital device 1022 executing via a web browser interface or via execution of an application running on a portable digital devices such as a mobile telephone or in a further alternative as a point-of-sale terminal in order to arrange for the database 1023 to generate a token 1021. In this instance the token 1021 will include better data 1024 including the recipient named, BIC, IBAN, destination country, mobile number, currency, business type, communication, payment amount. In this instance the token 1021 including the metadata 1024 is stored in the token database 1023. In addition the first transacting entity 1011 communicates the token 1021 to a digital device 1030 associated with second transacting entity 1012. In this instance the communication is by way of initial transmission of the token 1021 to digital device 1022 which then on transmits the token via Internet 1031 to digital device 1030.

With reference to FIG. 17, when ready to settle the financial transaction 1020 the second transacting entity 1012 "logs in" to a portal associated with second intermediary entity 1014 and communicates the token 1021. In this instance have the login can be executed via a web browser associated with digital device 1030 which communicates via Internet 1031 the token 1021 to a digital processing system 1032 (including at least a processor and a memory) associated with second intermediary entity 1014. Substantially at the same time as part of seeking to settle the financial transaction 1020:

Notification: token database 1023 notifies second intermediary entity 1014 to contact the token database 1023 from which it receives a further token 1021A.

Verification: token database 1023 communicates with the processing system 1032 of second intermediary entity 1014 to verify that sufficient funds are located in account 1016 as indicated in the meta data 1024 to settle the financial transaction.

Committing payer funds: payers bank debits payers account: payers bank sends notice to payer bank gateway: payers bank gateway calls token database 1023 to get approved token:

Settlement: gateway of payers bank sends by way of non-limiting example XRP (the native currency of the Ripple protocol) to billers bank gateway: payers bank gateway notifies token database 1023 of receipt:

Clearing: payer's bank may be a Nostro account which is debited subject to bank institution rules.

Embodiments of the invention can be implemented utilising the "Ripple" framework, protocol and gateway-or more generally any blockchain based framework. In a particular form the final settlement process can be enabled through a Ripple framework thereby to facilitate substantially real-time settlement across multiple institutions and multiple banks.

With further reference to FIG. 17 it will be observed that the token 1021, in this instance, may be conveyed between bank 1013 and bank 1014 by way of a medium 1060 utilizing the SWIFT protocol or other compatible protocols 1050. In preferred forms the medium the medium will be an electronic communications medium and in particular forms may be implemented by way of a VPN established between bank 1013 and bank 1014. Separately deidentified data 1051 A, B, C, D associated with the financial transaction to which the token pertains may be transmitted over a separate communication medium, in this instance internet 1031. In a preferred form the communication medium utilizes a blockchain structure as described earlier in this specification and the deidentified data 1051 A, B, C, D is located within a record structure 1061 which is replicated throughout the blockchain structure.

In use a sellers bank 1013 as part of entering into the financial transaction with buyers bank 1014 will establish a SWIFT transaction transmittable over medium 1060. Separately and preferably in parallel the sellers bank 1013 will perform associated operations needed to complete the financial transaction such as verification of the buyers ID and related characteristics. Data related to these associated operations is then placed in record structure 1061 and that record is placed into the blockchain structure. The associated data includes deidentifed data 1051 A, B, C, D.

This data is available to the buyers bank 1014 by way of the buyers bank logging into the blockchain structure and receiving the deidentified data which is associated with the financial transaction which is represented by token 1021. Thereby allowing assembly by the buyers bank 1014 of all necessary data to execute the financial transaction on behalf of the buyer and seller.

With reference to FIGS. 16 and 17 the system provides for communication of invoice/purchase order/remittance advice information as illustrated.

It will be further observed that blockchain structures may be utilized to provide an information layer above existing legacy systems (for example based on SWIFT protocols and the like) and wherein the additional information layer provides enriched information about payments using the token. It is to be noted that existing systems do not provide enriched information and, in more particular forms, do not provide deidentified information/data for use by the communicating parties.

The above describes only some embodiments of the present invention and modifications, obvious to those skilled in the art, can be made thereto without departing from the scope of the present invention.

The computer implemented method and the system for processing a financial transaction offers a plurality of advantages. First, the invention enables a wide variety of documents to be attached to a financial transaction, by means of a token. The existing financial messaging systems allow only specific information to be attached to the financial transaction.

Further, the invention enables generation of an auditable enriched data record from the documents. The enriched data record is stored in a distributed ledger (or the blockchain) and can be retrieved at any time when queried with the token. Further, the enriched data record ensures that integrity of the documents is maintained in perpetuity. Further, the documents stores enable maintaining of a state of the token. That is, a status of the financial transaction can be tracked at any time, from the respective documents stored in the document stores.

Other Exemplary Embodiments

Definitions

Token: in this specification a "token" is a pointer to an enriched data record of a plurality data required to process a financial transaction and wherein the plurality of data is rendered, formatted or passed through an algorithm in a predetermined manner. The process of rendering, formatting or passing through an algorithm in a predetermined manner is termed "tokenisation". The tokenisation process may involve operations such as encryption and de-identification of the plurality of data.

Financial Transaction: in this specification "financial transaction" refers to a trade between two parties, for example at least a first transacting entity and a second transacting entity and wherein the trade is expressed in a financial form (for example in a Fiat currency or an electronic currency-to be distinguished, for example, from a barter transaction) which will ultimately require exchange of currency to process the financial transaction. In some instances the currency will be the same on both sides of the financial transaction. In other cases a conversion from one currency to another may be required.

Personally Identifiable Information (PII): in this specification refers to information that a regulator or privacy policy will not allow to be disclosed to a third party.

Accordingly, in one broad form of the invention, there is provided a system for settling a financial transaction electronically; said system comprising:
at least a first transacting entity;
at least a second transacting entity;
at least a first intermediary entity;
at least a second intermediary entity;
in the case where the first transacting entity enters into a financial transaction with the second transacting entity generating a tokenised message at the time of the financial transaction containing data needed to settle the financial transaction;
initiating settlement of the financial transaction by transmission of the tokenised message to the at least first transacting entity.

In a further broad form of the invention there is provided a tokenised message construction system; said system comprising:
a server in communication with a database and which facilitates communications between a plurality of parties to a financial transaction; each party having a digitised device with which to communicate with other ones of the parties and with the server;
each party capable of generating a tokenised message via a bidirectional communication with the server.

Accordingly, in yet a further broad form of the invention there is provided tokenised message construction system; said system comprising:
a server in communication with a database and which facilitates communications between a plurality of parties to a financial transaction; each party having a digitised device with which to communicate with other ones the parties and with the server;
each party capable of generating a tokenised message via a bidirectional communication with the server.

Preferably the tokenised message is generated with reference to a token database located at a remote location.

Preferably the tokenised message includes at least a first data element, a second data element and a third data element.

Preferably the first data element comprises identification data for a payor, the second data element comprises identification data for a payee (biller) and the third data element comprises identification currency, denomination and value data.

Preferably a further tokenised message is generated by either an intermediary entity or the token database.

Preferably a tokenised message is generated by a bi-directional communication process.

Preferably the bi-directional communication process is between the token database and an intermediary entity.

Preferably a step in producing a tokenised message involves de-identifying data.

Preferably a step in producing a tokenised message involves adding a data element to the message.

Preferably a step in producing a tokenised message involves removing a data element from the message.

Preferably a step in producing a tokenised message involves applying an algorithm to the data elements in the message.

Preferably the token database sequences the tokenised messages.

Preferably the token database sequences the tokenised messages and transmits the tokenised messages as payment data records to a blockchain settlement system.

Preferably the blockchain settlement system employs the Ripple protocol.

Preferably the tokenised message includes at least a first data element, a second data element and a third data element.

Preferably the first data element comprises identification data for a payor, the second data element comprises identification data for a payee (biller) and the third data element comprises identification currency, denomination and value data.

Preferably a further tokenised message is generated by either an intermediary entity or the token database.

Preferably a tokenised message is generated by a bi-directional communication process.

Preferably the bi-directional communication process is between the token database and an intermediary entity.

Preferably a step in producing a tokenised message involves de-identifying data.

Preferably a step in producing a tokenised message involves adding a data element to the message.

Preferably a step in producing a tokenised message involves removing a data element from the message.

Preferably a step in producing a tokenised message involves applying an algorithm to the data elements in the message.

Preferably the token database sequences the tokenised messages.

Preferably the token database sequences the tokenised messages and transmits the tokenised messages as payment data records to a blockchain settlement system.

Preferably the blockchain settlement system employs the Ripple protocol.

Preferably a second message is transmitted between the intermediaries.

Preferably the second message is tokenised.

Preferably the second message contains conventional data.

Preferably the second message is transmitted by means of a blockchain system.

Preferably the second message includes information equivalent to that transmitted by the SWIFT system.

Preferably the tokenised message includes additional information beyond that transmitted by the SWIFT system.

The system wherein the tokenised message includes information which verifies the security status of at least one party to the financial transaction.

Preferably the second tokenised message includes information which verifies the security status of both parties to the financial transaction.

Preferably the token is conveyed by way of a medium utilizing the SWIFT messaging system or other compatible messaging system.

Preferably the medium is implemented by way of a VPN.

Preferably deidentified data associated with the financial transaction to which the token pertains is transmitted over a separate communication medium.

Preferably the separate communication medium utilizes a blockchain structure.

Preferably the deidentified data is located within a record structure which is replicated throughout the blockchain structure.

Preferably in use a sellers bank as part of entering into the financial transaction with buyers bank will establish a SWIFT transaction.

Preferably in parallel the sellers bank will perform associated operations needed to complete the financial transaction such as verification of the buyers ID and related characteristics.

Preferably data related to the associated operations is then placed in a record structure and that record is placed into the blockchain structure.

Preferably the associated data includes deidentifed data.

Preferably the data is available to the buyers bank by way of the buyers bank logging into the blockchain structure and receiving the deidentified data which is associated with the financial transaction which is represented by the token thereby allowing assembly by the buyers bank of all necessary data to execute the financial transaction on behalf of the buyer and seller.

Preferably incorporating secure channels thereby permitting only selected entities to communicate the data to execute the financial transaction on behalf of the buyer and seller.

Advantages

The invention is not limited to interaction between two banks only, but can be extended to any number of banks involved in the financial transaction. For example, the token can be included in all the financial messages sent between a plurality of banks, and the token can be used by any bank from the plurality of banks to verify the financial transaction from the enriched data record, before taking any further steps in the process.

The messaging bus allows all the financial institutions involved in the financial transaction to communicate in real-time and ensure that the payer, the beneficiary, and all the parameters corresponding to the financial transaction are validated. Further, encryption/decryption of the requests and responses using asymmetrical pairs of keys ensures that the transmission of the request and the responses is always secure. Further, the payment risk rating ensures better straight through processing by reducing exceptions and false positives. Also, the token is compatible with a large array of formats, including JSON, XML, CSV, SWIFT, over a number of transports, including HTTP, FTP, AMQP, and JMS.

Interpretation

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein. For the purposes of the present invention, additional terms are defined below. Furthermore, all definitions, as defined and used herein, should be understood to control over dictionary definitions, definitions in documents incorporated by reference, and/or ordinary meanings of the defined terms unless there is doubt as to the meaning of a particular term, in which case the common dictionary definition and/or common usage of the term will prevail.

The terminology used herein is for the purpose of describing particular embodiments only and is not intended to be limiting of the invention. As used herein, the singular articles "a", "an" and "the" are intended to include the plural forms as well, unless the context clearly indicates otherwise and thus are used herein to refer to one or to more than one (i.e. to "at least one") of the grammatical object of the article. By way of example, the phrase "an element" refers to one element or more than one element.

The term "about" is used herein to refer to quantities that vary by as much as 30%, preferably by as much as 20%, and more preferably by as much as 10% to a reference quantity. The use of the word 'about' to qualify a number is merely an express indication that the number is not to be construed as a precise value.

Throughout this specification, unless the context requires otherwise, the words "comprise", "comprises" and "comprising" will be understood to imply the inclusion of a stated step or element or group of steps or elements but not the exclusion of any other step or element or group of steps or elements.

The term "real-time" for example "displaying real-time data." refers to the display of the data without intentional delay, given the processing limitations of the system and the time required to accurately measure the data.

As used herein, the term "exemplary" is used in the sense of providing examples, as opposed to indicating quality. That is, an "exemplary embodiment" is an embodiment provided as an example, as opposed to necessarily being an embodiment of exemplary quality for example serving as a desirable model or representing the best of its kind.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, In one embodiment of the invention, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, In one embodiment of the invention, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Bus

In the context of this document, the term "bus" and its derivatives, while being described in a preferred embodiment as being a communication bus subsystem for interconnecting various devices including by way of parallel connectivity such as Industry Standard Architecture (ISA), conventional Peripheral Component Interconnect (PCI) and the like or serial connectivity such as PCI Express (PCIe), Serial Advanced Technology Attachment (Serial ATA) and the like, should be construed broadly herein as any system for communicating data.

In Accordance with

As described herein, 'in accordance with' may also mean 'as a function of' and is not necessarily limited to the integers specified in relation thereto.

Composite Items

As described herein, 'a computer implemented method' should not necessarily be inferred as being performed by a single computing device such that the steps of the computer implemented method may be performed by more than one cooperating computing devices.

Similarly objects as used herein such as 'web server', 'server', 'client computing device', 'computer readable medium' and the like should not necessarily be construed as being a single object, and may be implemented as a two or more objects in cooperation, such as, for example, a web server being construed as two or more web servers in a server farm cooperating to achieve a desired goal or a computer readable medium being distributed in a composite manner, such as program code being provided on a compact disk activatable by a license key downloadable from a computer network.

Database

In the context of this document, the term "database" and its derivatives may be used to describe a single database, a set of databases, a system of databases or the like. The system of databases may comprise a set of databases wherein the set of databases may be stored on a single implementation or span across multiple implementations. The term "database" is also not limited to refer to a certain database format rather may refer to any database format. For example, database formats may include MySQL, MySQLi, XML or the like.

Wireless

The invention may be embodied using devices conforming to other network standards and for other applications, including, for example other WLAN standards and other wireless standards. Applications that can be accommodated include IEEE 802.11 wireless LANs and links, and wireless Ethernet.

In the context of this document, the term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. In the context of this document, the term "wired" and its derivatives may be used to describe circuits, devices, systems, methods, techniques, communications channels, etc., that may communicate data through the use of modulated electromagnetic radiation through a solid medium. The term does not imply that the associated devices are coupled by electrically conductive wires.

Processes

Unless specifically stated otherwise, as apparent from the following discussions, it is appreciated that throughout the specification discussions utilizing terms such as "processing", "computing", "calculating", "determining", "analysing" or the like, refer to the action and/or processes of a computer or computing system, or similar electronic computing device, that manipulate and/or transform data represented as physical, such as electronic, quantities into other data similarly represented as physical quantities.

Processor

In a similar manner, the term "processor" may refer to any device or portion of a device that processes electronic data, e.g., from registers and/or memory to transform that electronic data into other electronic data that, e.g., may be stored in registers and/or memory. A "computer" or a "computing device" or a "computing machine" or a "computing platform" may include one or more processors.

The computer implemented methodologies described herein are, In one embodiment of the invention, performable by one or more processors that accept computer-readable (also called machine-readable) code containing a set of instructions that when executed by one or more of the processors carry out at least one of the computer implemented methods described herein. Any processor capable of executing a set of instructions (sequential or otherwise) that specify actions to be taken are included. Thus, one example is a typical processing system that includes one or more processors. The processing system further may include a memory subsystem including main RAM and/or a static RAM, and/or ROM.

Computer-Readable Medium

Furthermore, a computer-readable carrier medium may form, or be included in a computer program product. A computer program product can be stored on a computer usable carrier medium, the computer program product comprising a computer readable program means for causing a processor to perform a method as described herein.

Networked or Multiple Processors

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment. The one or more processors may form a web appliance, a network router, switch or bridge, or any machine capable of executing a set of instructions (sequential or otherwise) that specify actions to be taken by that machine.

Note that while some diagram(s) only show(s) a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the computer implemented methodologies discussed herein.

Additional Embodiments

Thus, one embodiment of each of the computer implemented methods described herein is in the form of a computer-readable carrier medium carrying a set of instructions, e.g., a computer program that are for execution on one or more processors. Thus, as will be appreciated by those skilled in the art, embodiments of the present invention may be embodied as a method, an apparatus such as a special purpose apparatus, an apparatus such as a data processing system, or a computer-readable carrier medium. The computer-readable carrier medium carries computer readable code including a set of instructions that when executed on one or more processors cause a processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

Carrier Medium

The software may further be transmitted or received over a network via a network interface device. While the carrier medium is shown in an example embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the computer implemented methodologies of the present invention. A carrier medium may take many forms, including but not limited to, non-volatile media, volatile media, and transmission media.

Implementation

It will be understood that the steps of methods discussed are performed

In one embodiment of the invention by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Means for Carrying Out a Method or Function

Furthermore, some of the embodiments are described herein as a method or combination of elements of a method that can be implemented by a processor of a processor device, computer system, or by other means of carrying out the function. Thus, a processor with the necessary instructions for carrying out such a method or element of a method forms a means for carrying out the computer implemented method or element of a method. Furthermore, an element described herein of an apparatus embodiment is an example of a means for carrying out the function performed by the element for the purpose of carrying out the invention.

Connected

Similarly, it is to be noticed that the term connected, when used in the claims, should not be interpreted as being limitative to direct connections only. Thus, the scope of the expression a device A connected to a device B should not be limited to devices or systems wherein an output of device A is directly connected to an input of device B. It means that there exists a path between an output of A and an input of B which may be a path including other devices or means. "Connected" may mean that two or more elements are either in direct physical or electrical contact, or that two or more elements are not in direct contact with each other but yet still co-operate or interact with each other.

Embodiments

Reference throughout this specification to "one embodiment" or "an embodiment" means that a particular feature, structure or characteristic described in connection with the embodiment is included in at least one embodiment of the present invention. Thus, appearances of the phrases "In one embodiment of the invention" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description of Specific Embodiments are hereby expressly incorporated into this Detailed Description of Specific Embodiments, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Specific Details

In the description provided herein, numerous specific details are set forth. However, it is understood that embodiments of the invention may be practiced without these specific details. In other instances, well-known methods, structures and techniques have not been shown in detail in order not to obscure an understanding of this description.

It will be appreciated that the computer implemented methods and systems described/illustrated above at least substantially provides a manner in which data generated in an EHR, during an episode of care, may be de-identified (or anonymized) and provided to a user through a secure channel.

The embodiments described herein, and/or shown in the drawings, are presented by way of example only and are not limiting as to the scope of the invention. Unless otherwise specifically stated, individual aspects and components of the embodiments may be modified, or may have been substituted therefore known equivalents, or as yet unknown substitutes such as may be developed in the future or such as may be found to be acceptable substitutes in the future. The embodiments may also be modified for a variety of applications while remaining within the scope and spirit of the claimed invention, since the range of potential applications is great, and since it is intended that the present invention be adaptable to many such variations.

Different Instances of Objects

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Comprising and Including

In the claims which follow and in the preceding description of the invention, except where the context requires otherwise due to express language or necessary implication, the word "comprise" or variations such as "comprises" or "comprising" are used in an inclusive sense, i.e. to specify the presence of the stated features but not to preclude the presence or addition of further features in various embodiments of the invention.

Any one of the terms: including or which includes or that includes as used herein is also an open term that also means including at least the elements/features that follow the term, but not excluding others. Thus, including is synonymous with and means comprising.

Scope of Invention

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

Although the invention has been described with reference to specific examples, it will be appreciated by those skilled in the art that the invention may be embodied in many other forms.

Chronological Order

For the purpose of this specification, where method steps are described in sequence, the sequence does not necessarily mean that the steps are to be carried out in chronological order in that sequence, unless there is no other logical manner of interpreting the sequence.

INDUSTRIAL APPLICABILITY

It is apparent from the above, that the arrangements described are applicable to the industries dealing with banking, brokerages, insurance companies, investment companies and Unit Investment Trusts (UIT) etc.

*Examples of tokenised messages and their generation and transmission*

The previous, meta-data mode is first. It switches to minimal half way through

--

Bank:HSBC >> createUserCode >> Sparro:Sparro
   {"id":"User:ABC Paper","name":"ABC Paper"}
(Creating Sparro User Code - Meta-data given can be used by other banks for compliance and for confirming payee with customers.)

--

Bank:MayBank >> createUserCode >> Sparro:Sparro
   {"id":"User:XYZ Printing","name":"XYZ Printing"}
(Creating Sparro User Code - Meta-data given can be used by other banks for compliance and for confirming payee with customers.)

--

Sparro:Sparro >> createUserCode-reply >> Bank:HSBC
   {"id":"User:ABC Paper","name":"ABC Paper","code":"65q3gdd"}

--

Sparro:Sparro >> createUserCode-reply >> Bank:MayBank
   {"id":"User:XYZ Printing","name":"XYZ Printing","code":"70wqgx6"}

--

User:ABC Paper >> createInvoice >> Bank:HSBC
   {"amount":{"amount":1000,"currency":"gbp"}}

--

Bank:HSBC >> createInvoiceCode >> Sparro:Sparro
   {"amount":{"amount":1000,"currency":"gbp"},"payee":"65q3gdd"}
(Creating Invoice Code - An invoice code is created by Sparro and connected to the bank.)

-

Sparro:Sparro >> createInvoiceCode-reply >> Bank:HSBC
   {"code":"6tq6wcbad"}

--

Bank:HSBC >> createInvoice-reply >> User:ABC Paper

{"invoice":{"amount":{"amount":1000,"currency":"gbp"},"payee":
"65q3gdd","code":"6tq6wcbad"}}

Abc invoice { amount: { amount: 1000, currency: 'gbp' }, payee: '65q3gdd', code: '6tq6wcbad' }

--

User:ABC Paper >> invoice >> User:XYZ Printing

{"amount":{"amount":1000,"currency":"gbp"},"payee":"65q3gdd","code":
"6tq6wcbad"}

-

User:XYZ Printing >> payInvoice >> Bank:MayBank

{"invoice":"6tq6wcbad","amount":{"currency":"GBP","amount":300}}

--

Bank:MayBank >> sendMoney >> BankGateway:MayBank

{"payer":"70wqgx6","invoice":"6tq6wcbad","amount":{"currency":"GBP",
"amount":300}}

--

BankGateway:MayBank >> getInvoice >> Sparro:Sparro

"6tq6wcbad"

(Sending Payment to Invoice - The payment is sent to the bank that created the invoice.)

--

Sparro:Sparro >> getInvoice-reply >> BankGateway:MayBank

{"bank":"Bank:HSBC","invoice":{"amount":{"amount":1000,"currency":
"gbp"},"payee":"65q3gdd","code":"6tq6wcbad"}}

--

BankGateway:MayBank >> transfer >> BankGateway:HSBC

{"payer":"70wqgx6","invoice":"6tq6wcbad","amount":{"currency":"GBP",
"amount":300},"id":"ripple-1"}

--

BankGateway:HSBC >> incomingTransfer >> Bank:HSBC

{"payer":"70wqgx6","invoice":"6tq6wcbad","amount":{"currency":"GBP", "amount":300},"id":"ripple-1"}

--

BankGateway:HSBC >> transfer-reply >> BankGateway:MayBank

{"success":true,"owed":{"GBP":300}}

--

Bank:HSBC >> getInvoice >> Sparro:Sparro

"6tq6wcbad"

--

BankGateway:MayBank >> sendMoney-reply >> Bank:MayBank

{"payer":"70wqgx6","invoice":"6tq6wcbad","amount":{"currency":"GBP", "amount":300},"id":"ripple-1"}

--

Sparro:Sparro >> getInvoice-reply >> Bank:HSBC

{"bank":"Bank:HSBC","invoice":{"amount":{"amount":1000,"currency": "gbp"},"payee":"65q3gdd","code":"6tq6wcbad"}}

--

Bank:MayBank >> payInvoice-reply >> User:XYZ Printing

{"payer":"70wqgx6","invoice":"6tq6wcbad","amount":{"currency":"GBP", "amount":300},"id":"ripple-1"}

XYZ part-paid invoice {
 "payer": "70wqgx6",
 "invoice": "6tq6wcbad",
 "amount": {
  "currency": "GBP",
  "amount": 300
 },
 "id": "ripple-1"

--

Bank:HSBC >> incomingTransfer >> User:ABC Paper

{"invoice":{"amount":{"amount":1000,"currency":"gbp"},"payee": "65q3gdd","code":"6tq6wcbad"},"transfer":{"payer":"70wqgx6","invoice": "6tq6wcbad","amount":{"currency":"GBP","amount":300},"id":"ripple-1"}}

-

User:XYZ Printing >> payInvoice >> Bank:MayBank

{"invoice":"6tq6wcbad","amount":{"currency":"GBP","amount":700}}

--

Bank:MayBank >> sendMoney >> BankGateway:MayBank

{"payer":"70wqgx6","invoice":"6tq6wcbad","amount":{"currency":"GBP", "amount":700}}

--

BankGateway:MayBank >> getInvoice >> Sparro:Sparro

"6tq6wcbad"

(Sending Payment to Invoice - The payment is sent to the bank that created the invoice.)

--

Sparro:Sparro >> getInvoice-reply >> BankGateway:MayBank

{"bank":"Bank:HSBC","invoice":{"amount":{"amount":1000, "currency":"gbp"},"payee":"65q3gdd","code":"6tq6wcbad"}}

--

BankGateway:MayBank >> transfer >> BankGateway:HSBC

{"payer":"70wqgx6","invoice":"6tq6wcbad","amount": {"currency":"GBP","amount":700},"id":"ripple-2"}

--

BankGateway:HSBC >> incomingTransfer >> Bank:HSBC

{"payer":"70wqgx6","invoice":"6tq6wcbad","amount": {"currency":"GBP","amount":700},"id":"ripple-2"}

--

BankGateway:HSBC >> transfer-reply >> BankGateway:MayBank

{"success":true,"owed":{"GBP":1000}}

--

Bank:HSBC >> getInvoice >> Sparro:Sparro
  "6tq6wcbad"

-

BankGateway:MayBank >> sendMoney-reply >> Bank:MayBank
  {"payer":"70wqgx6","invoice":"6tq6wcbad","amount":
{"currency":"GBP","amount":700},"id":"ripple-2"}

--

Sparro:Sparro >> getInvoice-reply >> Bank:HSBC
  {"bank":"Bank:HSBC","invoice":{"amount":{"amount":
1000,"currency":"gbp"},"payee":"65q3gdd","code":"6tq6wcbad"}}

--

Bank:MayBank >> payInvoice-reply >> User:XYZ Printing
  {"payer":"70wqgx6","invoice":"6tq6wcbad","amount":
{"currency":"GBP","amount":700},"id":"ripple-2"}
XYZ finished paying invoice {
  "payer": "70wqgx6",
  "invoice": "6tq6wcbad",
  "amount": {
    "currency": "GBP",
    "amount": 700
  },
  "id": "ripple-2"
}
--- SWITCHING TO MODE: minimal ---

--

Bank:HSBC >> incomingTransfer >> User:ABC Paper
  {"invoice":{"amount":{"amount":1000,"currency":"gbp"},
"payee":"65q3gdd","code":"6tq6wcbad"},"transfer":
{"payer":"70wqgx6","invoice":"6tq6wcbad","amount":

{"currency":"GBP","amount":700},"id":"ripple-2"}}

--Bank:HSBC >> createUserCode >> Sparro:Sparro
   undefined
(Creating Sparro User Code - No meta-data is required.)

--

Bank:MayBank >> createUserCode >> Sparro:Sparro
   undefined
(Creating Sparro User Code - No meta-data is required.)

--

Sparro:Sparro >> createUserCode-reply >> Bank:HSBC
   {"code":"dnt7gec"}

--

Sparro:Sparro >> createUserCode-reply >> Bank:MayBank
   {"code":"6wwpwuc"}

--

User:ABC Paper >> createInvoice >> Bank:HSBC
   {"amount":{"amount":2000,"currency":"gbp"}}

--

Bank:HSBC >> createInvoiceCode >> Sparro:Sparro
   null
(Creating Invoice Code - An invoice code is created by Sparro and connected to the bank. No invoice details are required.)

--

Sparro:Sparro >> createInvoiceCode-reply >> Bank:HSBC
   {"code":"erwkax1md"}

--Bank:HSBC >> createInvoice-reply >> User:ABC Paper
   {"invoice":{"amount":{"amount":2000,"currency":"gbp"},
"code":"erwkax1md","payee":"User:ABC Paper","transfers":[]}}
   Abc invoice { amount: { amount: 2000, currency: 'gbp' },
     code: 'erwkax1md',
     payee: 'User:ABC Paper', transfers: [] }

--

User:ABC Paper >> invoice >> User:XYZ Printing
   {"amount":{"amount":2000,"currency":"gbp"},"code":
"erwkax1md","payee":"User:ABC Paper","transfers":[]}

--

User:XYZ Printing >> payInvoice >> Bank:MayBank
   {"invoice":"erwkax1md","amount":{"currency":"GBP","amount":600}}

--

Bank:MayBank >> sendMoney >> BankGateway:MayBank
   {"payer":"6wwpwuc","invoice":"erwkax1md","amount":
{"currency":"GBP","amount":600}}

--

BankGateway:MayBank >> getInvoice >> Sparro:Sparro
   "erwkax1md"
 (Sending Payment to Invoice - The payment is sent to the bank
that created the invoice.)

--

Sparro:Sparro >> getInvoice-reply >> BankGateway:MayBank
   {"bank":"Bank:HSBC"}

--

BankGateway:MayBank >> transfer >> BankGateway:HSBC
   {"payer":"6wwpwuc","invoice":"erwkax1md","amount":
{"currency":"GBP","amount":600},"id":"ripple-3"}

--

BankGateway:HSBC >> incomingTransfer >> Bank:HSBC
   {"payer":"6wwpwuc","invoice":"erwkax1md","amount":
{"currency":"GBP","amount":600},"id":"ripple-3"}

--

BankGateway:HSBC >> transfer-reply >> BankGateway:MayBank
   {"success":true,"owed":{"GBP":600}}

--

Bank:HSBC >> incomingTransfer >> User:ABC Paper

{"invoice":{"amount":{"amount":2000,"currency":"gbp"},"code":
"erwkax1md","payee":"User:ABC
Paper","transfers":[{"payer":"6wwpwuc","invoice":
"erwkax1md","amount":{"currency":"GBP","amount":600},"id":"ripple-
3"}]},"transfer":{"payer":"6wwpwuc","invoice":"erwkax1md",
"amount":{"currency":"GBP","amount":600},"id":"ripple-3"}}

--

BankGateway:MayBank >> sendMoney-reply >> Bank:MayBank

{"payer":"6wwpwuc","invoice":"erwkax1md","amount":
{"currency":"GBP","amount":600},"id":"ripple-3"}

--

Bank:MayBank >> payInvoice-reply >> User:XYZ Printing

{"payer":"6wwpwuc","invoice":"erwkax1md","amount":
{"currency":"GBP","amount":600},"id":"ripple-3"}

XYZ part-paid invoice {
  "payer": "6wwpwuc",
  "invoice": "erwkax1md",
  "amount": {
    "currency": "GBP",
    "amount": 600
  },
  "id": "ripple-3"
}

--

User:XYZ Printing >> payInvoice >> Bank:MayBank

{"invoice":"erwkax1md","amount":{"currency":"GBP","amount":1400}}

--

Bank:MayBank >> sendMoney >> BankGateway:MayBank

{"payer":"6wwpwuc","invoice":"erwkax1md","amount":

{"currency":"GBP","amount":1400}}

--

BankGateway:MayBank >> getInvoice >> Sparro:Sparro
  "erwkax1md"

(Sending Payment to Invoice - The payment is sent to the bank that created the invoice.)

--

Sparro:Sparro >> getInvoice-reply >> BankGateway:MayBank
  {"bank":"Bank:HSBC"}

-

BankGateway:MayBank >> transfer >> BankGateway:HSBC
  {"payer":"6wwpwuc","invoice":"erwkax1md","amount":
{"currency":"GBP","amount":1400},"id":"ripple-4"}

--

BankGateway:HSBC >> incomingTransfer >> Bank:HSBC
  {"payer":"6wwpwuc","invoice":"erwkax1md","amount":
{"currency":"GBP","amount":1400},"id":"ripple-4"}

BankGateway:HSBC >> transfer-reply >> BankGateway:MayBank
  {"success":true,"owed":{"GBP":2000}}

--

Bank:HSBC >> incomingTransfer >> User:ABC Paper
  {"invoice":{"amount":{"amount":2000,"currency":"gbp"},"code":
"erwkax1md","payee":"User:ABC
Paper","transfers":[{"payer":"6wwpwuc","invoice":"erwkax1md",
"amount":{"currency":"GBP","amount":600},"id":"ripple-
3"},{"payer":"6wwpwuc","invoice":"erwkax1md","amount":
{"currency":"GBP","amount":1400},"id":"ripple-
4"}]},"transfer":{"payer":"6wwpwuc","invoice":"erwkax1md",
"amount":{"currency":"GBP","amount":1400},"id":"ripple-4"}}

--

BankGateway:MayBank >> sendMoney-reply >> Bank:MayBank

{"payer":"6wwpwuc","invoice":"erwkax1md","amount": {"currency":"GBP","amount":1400},"id":"ripple-4"}

--

Bank:MayBank >> payInvoice-reply >> User:XYZ Printing

{"payer":"6wwpwuc","invoice":"erwkax1md","amount": {"currency":"GBP","amount":1400},"id":"ripple-4"}

XYZ finished paying invoice {
  "payer": "6wwpwuc",
  "invoice": "erwkax1md",
  "amount": {
    "currency": "GBP",
    "amount": 1400
  },
  "id": "ripple-4"
}

The invention claimed is:

1. A computer implemented method for processing a financial transaction, the method comprising the steps of:
   transmitting one or more documents pertaining to the financial transaction, from a first intermediary server in a centralised financial system to a first document store;
   generating an enriched data record from the one or more documents, at the first intermediary server, and adding the enriched data record into a blockchain being a distributed ledger, from the first intermediary server;
   requesting generation of a token corresponding to the financial transaction to identify the one or more documents, to a token server, from the first intermediary server, via a messaging bus in the centralised financial system;
   generating the token at the token server and adding the token into the blockchain from the token server in association with the enriched data record;
   transmitting the token to the first intermediary server from the token server, via the messaging bus; and
   transmitting the token from the first intermediary server to the first document store in association with the one or more documents.

2. The computer implemented method as claimed in claim 1, further comprising the step of sending a first financial message comprising the token, from the first intermediary server to a second intermediary server in the centralised financial system, indicative of making a payment to a second user.

3. The computer implemented method as claimed in claim 1, further comprising the steps of:
   implementing a smart contract at the token server; and
   adding the smart contract into the blockchain, from the token server.

4. The computer implemented method as claimed in claim 1,
   further comprising the steps of:
   transmitting the token from the first intermediary server to a first digital device available with a first user;
   providing the token to a second user, by the first user;
   providing the token to a second intermediary server in the centralised financial system, from a second digital device;
   transmitting the token to a second document store, from the second intermediary server; and
   sending a second financial message comprising the token, from the second intermediary server to the first intermediary server, indicative of making a payment to the first user.

5. The computer implemented method as claimed in claim 1, wherein the step of generating the enriched data record comprises:
   extracting a plurality of attributes from the one or more documents, at the first intermediary server; and
   combining the plurality of attributes to generate the enriched data record, at the first intermediary server.

6. The computer implemented method as claimed in claim 1, wherein the step of generating the enriched data record comprises:
   extracting a plurality of attributes from the one or more documents, at the first intermediary server;
   de-identifying the plurality of attributes to obtain a plurality of de-identified attributes, at the first intermediary server; and
   combining the plurality of de-identified attributes to generate the enriched data record, at the first intermediary server.

7. The computer implemented method as claimed in claim 1, wherein the step of generating the enriched data record comprises:
   extracting a plurality of attributes from the one or more documents, at the first intermediary server;
   hashing the plurality of attributes to generate a plurality of respective hashes, at the first intermediary server; and
   combining the plurality of hashes to generate the enriched data record, at the first intermediary server.

8. The computer implemented method as claimed in claim 1, further comprising the steps of:
   transmitting one or more first requests, each comprising the token, from the first intermediary server to a second intermediary server in the centralised financial system, via the messaging bus;
   receiving the one or more first requests at the second intermediary server and transmitting the one or more first requests and the token from the second intermediary server to a second document store;
   generating one or more first responses, each comprising the token, corresponding to the respective one or more first requests, at the second intermediary server;
   transmitting the one or more first responses from the second intermediary server to the first intermediary server, via the messaging bus;
   hashing the one or more first requests and the one or more first responses at the second intermediary server to generate one or more first request hashes and one or more first response hashes, respectively;
   adding the one or more first request hashes and the one or more first response hashes to the enriched data record in the blockchain, from the second intermediary server; and
   receiving the one or more first responses at the first intermediary server and transmitting the one or more first responses to the first document store.

9. The computer implemented method as claimed in claim 8, further comprising the steps of:
   hashing the one or more first responses at the first intermediary server to regenerate the one or more first response hashes; and
   verifying the one or more first response hashes with the blockchain from the first intermediary server, using the token.

10. The computer implemented method as claimed in claim 8, wherein each one of the one or more first requests are:
   encrypted with a second public key and signed with a first public key at the first intermediary server, before transmission to the second intermediary server; and
   decrypted with a second private key at the second intermediary server after reception from the first intermediary server; and
   wherein each one of the one or more first responses are:
   encrypted with the first public key and signed with the second public key at the second intermediary server, before transmission to the first intermediary server; and
   decrypted with a first private key at the first intermediary server after reception from the second intermediary server.

11. The computer implemented method as claimed in claim 10, further comprising the steps of adding the first public key from the first intermediary server into the blockchain and adding the second public key from the second intermediary server into the blockchain.

12. The computer implemented method as claimed in claim 1, further comprising the steps of:
- transmitting one or more second requests, each comprising the token, from a second intermediary server in the centralised financial system to the first intermediary server, via the messaging bus;
- receiving the one or more second requests at the first intermediary server and transmitting the one or more second requests from the first intermediary server to the first document store;
- generating one or more second responses, each comprising the token, corresponding to the respective one or more second requests, at the first intermediary server;
- transmitting the one or more second responses from the first intermediary server to the second intermediary server, via the messaging bus;
- hashing the one or more second requests and the one or more second responses at the first intermediary server to generate one or more second request hashes and one or more second response hashes, respectively;
- adding the one or more second request hashes and the one or more second response hashes to the enriched data record in the blockchain, from the first intermediary server; and
- receiving the one or more second responses at the second intermediary server and transmitting the one or more second responses to the second document store.

13. The computer implemented method as claimed in claim 12, further comprising the steps of:
- hashing the one or more second responses at the second intermediary server to regenerate the one or more second response hashes; and
- verifying the one or more second response hashes with the blockchain from the second intermediary server, using the token.

14. The computer implemented method as claimed in claim 12, wherein each one of the one or more second requests are:
- encrypted with a first public key and signed with a second public key at the second intermediary server, before transmission to the first intermediary server; and
- decrypted with a first private key at the first intermediary server after reception from the second intermediary server; and wherein each one of the one or more second responses are:
- encrypted with the second public key and signed with the first public key at the first intermediary server, before transmission to the second intermediary server; and
- decrypted with a second private key at the second intermediary server after reception from the first intermediary server.

15. A system for processing a financial transaction, the system comprising:
- a first intermediary server in a centralised financial system, the first intermediary server being operably connected to a network and a first document store;
- a token server operably connected to the network;
- a messaging bus in the centralised financial system, the messaging bus being operably connected to the network; and
- a blockchain operably connected to the network, the blockchain being a distributed ledger;

wherein the first intermediary server is configured to:
- transmit one or more documents pertaining to the financial transaction, to the first document store;
- generate an enriched data record from the one or more documents and add the enriched data record into the blockchain;
- request generation of a token corresponding to the financial transaction to identify the one or more documents, to the token server, via the messaging bus; and
- transmit the token to the first document store;

wherein the token server is configured to:
- generate the token and add the token into the blockchain in association with the enriched data record; and
- transmit the token to the first intermediary server, via the messaging bus.

16. A first intermediary server for use in a centralised financial system to facilitate processing of a financial transaction, operably connected to a network and a first document store, and configured to:
- transmit one or more documents pertaining to the financial transaction, to the first document store;
- generate an enriched data record from the one or more documents and add the enriched data record into a blockchain being a distributed ledger;
- request generation of a token corresponding to the financial transaction to identify the one or more documents, to a token server, via a messaging bus in the centralised financial system; and
- transmit the token to the first document store.

17. The first intermediary server as claimed in claim 16, further configured to send a first financial message comprising the token, to a second intermediary server in the centralised financial system, indicative of making a payment to a second user.

18. The first intermediary server as claimed in claim 16, further configured to transmit the token to a first digital device.

19. The first intermediary server as claimed in claim 16, further configured to:
- transmit one or more first requests, each comprising the token, to a second intermediary server in the centralised financial system, via the messaging bus; and
- receive one or more first responses from the second intermediary server and transmit the one or more first responses to the first document store.

20. The first intermediary server as claimed in claim 19, wherein the one or more first responses comprise one or more second regulatory compliance documents pertaining to a second user.

\* \* \* \* \*